US010109154B2

(12) United States Patent
Hasegawa et al.

(10) Patent No.: US 10,109,154 B2
(45) Date of Patent: Oct. 23, 2018

(54) ROULETTE LOTTERY APPARATUS AND TIMING CONTROL PROGRAM THEREOF

(71) Applicant: SEGA SAMMY CREATION INC., Tokyo (JP)

(72) Inventors: Takashi Hasegawa, Tokyo (JP); Hiroyuki Miyano, Tokyo (JP); Hiroki Ashigaya, Tokyo (JP)

(73) Assignee: SEGA SAMMY CREATION INC., Tokyo (JP)

(*) Notice: Subject to any disclaimer, the term of this patent is extended or adjusted under 35 U.S.C. 154(b) by 112 days.

(21) Appl. No.: 14/764,517

(22) PCT Filed: Sep. 11, 2013

(86) PCT No.: PCT/JP2013/074590

§ 371 (c)(1),
(2) Date: Jul. 29, 2015

(87) PCT Pub. No.: WO2015/037092

PCT Pub. Date: Mar. 19, 2015

(65) Prior Publication Data

US 2016/0180651 A1 Jun. 23, 2016

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2018.01) |
| ***G07F 17/32*** | (2006.01) |

(Continued)

(52) U.S. Cl.
CPC ............ *G07F 17/3269* (2013.01); *A63F 5/02* (2013.01); *A63F 5/043* (2013.01); *G07F 17/322* (2013.01); *G07F 17/329* (2013.01); *G07F 17/3213* (2013.01); *G07F 17/3258* (2013.01); *A63F 5/045* (2013.01)

(58) Field of Classification Search
USPC .............................. 463/1, 17, 20, 22, 25, 31
See application file for complete search history.

(56) References Cited

U.S. PATENT DOCUMENTS

| | | | | |
|---|---|---|---|---|
| 6,164,646 | A | 12/2000 | Uehara et al. | |
| 2006/0170154 | A1* | 8/2006 | Matsuno | A63F 5/00 273/142 R |

(Continued)

FOREIGN PATENT DOCUMENTS

| | | | |
|---|---|---|---|
| JP | 11-137770 | A | 5/1999 |
| JP | 2007-000451 | A | 1/2007 |
| JP | 2008-220815 | A | 9/2008 |

*Primary Examiner* — Adetokunbo O Torimiro
(74) *Attorney, Agent, or Firm* — Drinker Biddle & Reath LLP

(57) ABSTRACT

A roulette lottery apparatus includes a roulette body configured to revolve about a rotation center line tilted about the vertical direction, in which plural pockets are arranged in the circumferential direction, a guide rail that guides a ball to any of the plural pockets, a ball release device that injects the ball into the guide rail, and a control unit that controls a timing of injecting the ball. The timing of injecting the ball is controlled at an angle unit smaller than 2π/N when N represents the total number of pockets. The object is to cause plural players to view the roulette lottery apparatus and to equalize probabilities that plural pockets win a game ball.

6 Claims, 18 Drawing Sheets

(51) Int. Cl.

| | |
|---|---|
| ***A63F 5/02*** | (2006.01) |
| ***A63F 5/04*** | (2006.01) |

(56) References Cited

U.S. PATENT DOCUMENTS

| | | | | |
|---|---|---|---|---|
| 2007/0010312 | A1 | 1/2007 | Ike et al. | |
| 2008/0227535 | A1 | 9/2008 | Yoshizawa | |
| 2010/0120488 | A1 | 5/2010 | Savytskyy | |
| 2010/0124966 | A1 | 5/2010 | Kido | |
| 2012/0115562 | A1* | 5/2012 | Kido | G07F 17/3211 463/17 |
| 2013/0072281 | A1* | 3/2013 | Sasaki | G07F 17/32 463/17 |

* cited by examiner

ROULETTE LOTTERY APPARATUS AND TIMING CONTROL PROGRAM THEREOF

CROSS-REFERENCE TO RELATED APPLICATION

This application is the U.S. national phase of the International Patent Application No. PCT/JP2013/074590 filed Sep. 11, 2013, the entire content of which is incorporated herein by reference.

FIELD

The present disclosure relates to a roulette lottery apparatus that mechanically implements a roulette game, and more particularly, to a roulette lottery apparatus in which a rotation center line of a roulette rotator is tilted about the vertical direction and a timing control program thereof.

BACKGROUND

A roulette game is a game machine in which a betting target is one of plural pockets formed in a roulette body (also referred to as a will, a wheel, or the like) into which a ball will go. The roulette body is provided with pockets having numerals of "0" and "1" to "36" attached thereto and an additional pocket of "00" in some cases, and the number of the pocket into which the ball goes is determined as a winning number.

Conventionally, an apparatus configured to mechanically implement a roulette game under control of a computer or the like has been developed. For example, Japanese Patent Application No. JP2008-220815 A discloses a game machine which comprises a roulette device 3 for implementing a roulette game, an image display device 10 for implementing a slot game along with the roulette game, an operation unit, which is displayed on the image display device 10, for performing a betting operation based on result prediction of the game implemented in at least one device, and a control unit for controlling game operations in the roulette game and the slot game and controlling the betting operation from the operation unit and a process of paying game values based on payout and which is configured to apply the result of the roulette game to the slot game and to establish the result of the slot game (FIG. 1).

SUMMARY

In the technique described in JP2008-220815, since the roulette body is arranged horizontally similarly to in a real roulette game, satellites provided with the image display devices which are operated by players should be arranged to surround the roulette body so as to visually recognize the roulette body and thus an increase in the number of satellites is limited.

In the roulette apparatus described in JP2008-220815, since the roulette body is arranged horizontally, an injected ball collides with protrusions of the roulette body or trays several times and probabilities that the ball goes into each of plural pockets are equalized. For example, even when mechanical precision of the roulette body is poor, no phenomenon that the ball more easily goes into a specific pocket depending on the ball injection timing does occur.

In consideration of the above-mentioned circumstances, it is considered that the rotation axis of the roulette body is tilted about the vertical direction so as to enable plural players to easily view the roulette body. However, when the rotation axis of the roulette body is tilted from the vertical direction, an operation of injecting a ball at a high speed and causing the ball to collide several times cannot be carried out. When there is no collision of a ball, there is a high possibility that probabilities that the ball goes into the plural pockets may not be equalized by the low mechanical precision.

Therefore, an object of the present disclosure is to provide a roulette lottery apparatus which can cause plural players to easily view the roulette lottery apparatus and which can equalize probabilities that a game ball goes into each of plural pockets win and a timing control program of the roulette lottery apparatus.

SUMMARY (1) In order to achieve the above-mentioned object, embodiments provide a roulette lottery apparatus comprising: a first rotating body configured to revolve about a rotation center line tilted about a vertical direction, in which a plurality of first pockets are arranged in a circumferential direction in a first circumferential area separated by a first distance in a radial direction from the rotation center line; a first guide mechanism that guides a first lottery ball to any one of the plurality of first pockets and that guides the first lottery ball in an area including at least a lowest point of the first circumferential area in which the plurality of first pockets revolve; a first lottery ball injecting mechanism that injects the first lottery ball into the first guide mechanism; and a control unit that controls a timing of injecting the first lottery ball. The control unit controls the timing of injecting the first lottery ball at an angle unit smaller than $2\pi/\mathbf{N1}$ (of which the unit is [rad], which is true in the following) when N1 (where N1 is a natural number) represents the total number of the plurality of first pockets.

The following embodiments may be incorporated as desired.

(2) In (1)

The control unit obtains one number P1 out of natural numbers of 0 to M1*N1 by generation of a random number when M1 represents a predetermined natural number, and injects the first lottery ball when the first rotating body rotates by an angle $\mathbf{P1}*2\pi[\text{rad}]/(\mathbf{M1}*\mathbf{N1})$ from a reference position of the first rotating body.

(3) In (1) or (2)

The roulette lottery apparatus further comprises: a second rotating body configured to revolve about the rotation center line, in which a plurality of second pockets are arranged in the circumferential direction in a second circumferential area separated by a second distance in the radial direction from the rotation center line; a second guide mechanism that guides a second lottery ball to any one of the plurality of second pockets and that guides the second lottery ball in an area including at least a lowest point of the second circumferential area in which the plurality of second pockets revolve; and a second lottery ball injecting mechanism that injects the second lottery ball into the second guide mechanism, and the control unit controls the timing of injecting the second lottery ball at an angle unit smaller than $2\pi/\mathbf{N2}$ when N2 (where N2 is a natural number) represents the total number of the plurality of second pockets.

(4) In (3)

The control unit calculates one number P2 out of natural numbers of 0 to M2*N2 by random number calculation when M2 represents a predetermined natural number, and injects the second lottery ball when the second rotating body rotates by P2*2π/(M2*N2) from a reference position of the second rotating body.

(5) In (3) or (4)

The control unit injects the second lottery ball after the first lottery ball is guided to any one of the plurality of first pockets of the first rotating body.

(6)

A timing control program of a roulette lottery apparatus is provided and the roulette lottery apparatus has a first rotating body configured to revolve about a rotation center line tilted about a vertical direction, in which a plurality of first pockets are arranged in a circumferential direction in a first circumferential area separated by a first distance in a radial direction from the rotation center line, a first guide mechanism that guides a first lottery ball to any one of the plurality of first pockets and that guides the first lottery ball in an area including at least a lowest point of the first circumferential area in which the plurality of first pockets revolves, a first lottery ball injecting mechanism that injects the first lottery ball into the first guide mechanism, and a control unit that controls a timing of injecting the first lottery ball. The timing control program causes the control unit to perform: a function of calculating one number P1 out of natural numbers of 0 to M1*N1 by random number calculation when N1 (where N1 is a natural number) represents the total number of the plurality of first pockets and M1 represents a predetermined natural number; a function of measuring a rotation angle from a reference position of the first rotating body; and a function of injecting the first lottery ball when the first rotating body rotates by an angle P1*2π/(M1*N1) from the reference position of the first rotating body.

DETAILED DESCRIPTION

Figure 1:
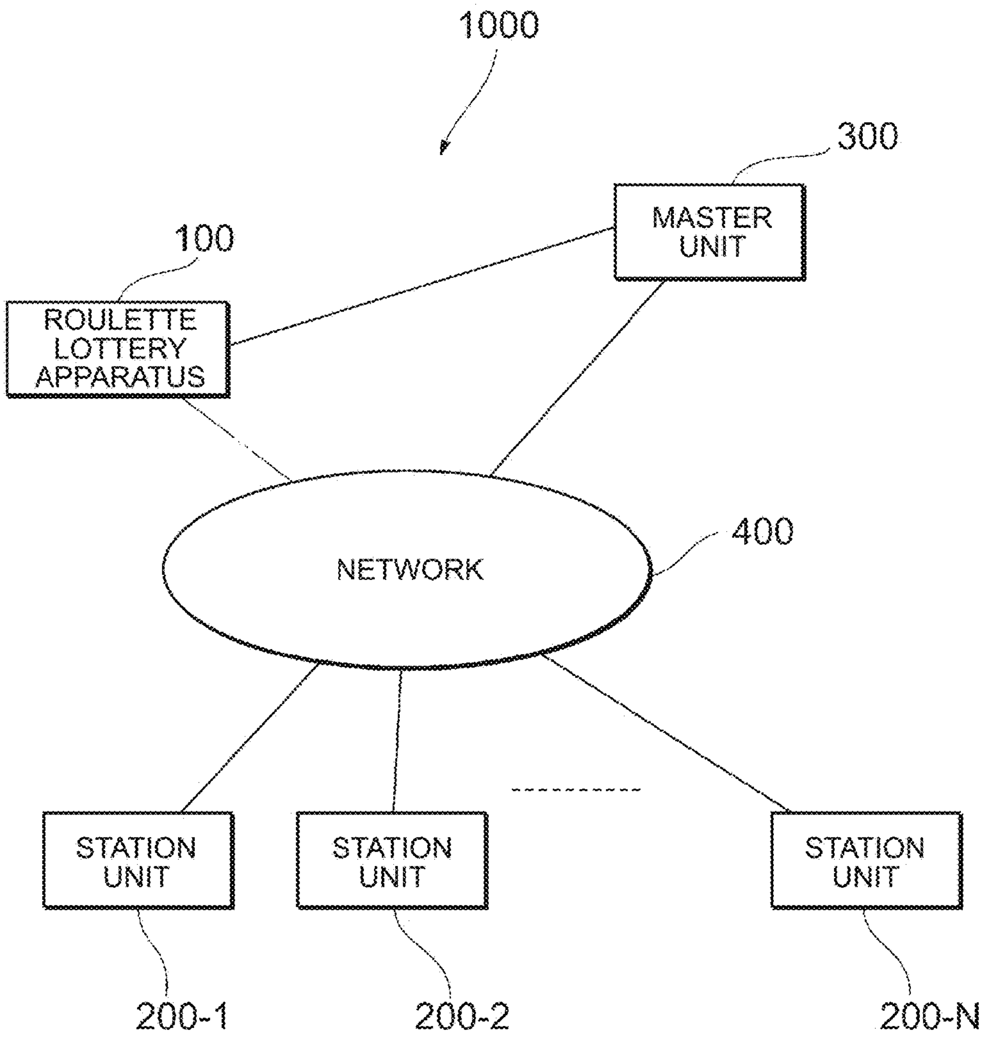
FIG. 1 is a system block diagram illustrating a roulette game system according to an embodiment of the present disclosure.

Hereinafter, an embodiment of the present disclosure will be described in detail. The present disclosure is not limited to this embodiment, and can be modified in various forms without departing from the gist thereof. Embodiments in which elements to be described below are replaced with equivalents can be employed by those skilled in the art and these embodiments also belong to the scope of the present disclosure. The positional relationships such as upper, lower, left, and right described if necessary are based on the drawings as long as it is not otherwise specified. Various scales in the drawings are not limited to the illustrated scales. For the purpose of easy understanding, the embodiment of the present disclosure will be described using an information processing apparatus for a game as an example, but it is not limited to this example as described above.

Terms used in this specification are defined as follows.

"Rotation center line": an axis serving as a center of rotation and which is a virtual axis in a geometric concept and does not require a physical axis.

"Rotating body": a structure rotationally moving or rotating about the rotation center line. Particularly, in this embodiment, the rotating body corresponds to a roulette body and means each or a combination of plural annular rotating bodies having different diameters, which are configured to rotate about the same rotation center line.

"Circumferential area": an area separated by a predetermined distance in the radial direction from the rotation center line and having a predetermined width in the radial direction. For example, number indicators and pockets are arranged in this area.

"Lottery ball": a moving object associated with lottery of the roulette lottery apparatus and which freely rolls under gravity depending on the tilt of the plane on which the lottery ball is placed. The lottery ball is typically a spherical body and corresponds to a ball in this embodiment. However, the lottery ball is not limited to the spherical body.

"Pockets": a pocket which is installed in the circumferential area, which are openings continuously arranged in the circumferential direction, and which have a size such that the lottery ball can enter.

"Guide rail": a guide mechanism defining a range in which the lottery ball under gravity rolls and swings in the circumferential direction.

"Injection": releasing constraint of the lottery ball on the plane of the guide rail, including releasing locking of the lottery ball on the plane of the guide rail and dropping the lottery ball onto the guide rail.

"Reference position": a position (angle) serving as a start point for measuring a degree of rotation (rotation angle) of the rotating body (roulette body). For example, a 6:00 position when the roulette body stands upright is set as the reference position in this embodiment.

"Timing": an angle measured from the reference position, a time, or relative values thereof and which is a numerical value which is detected by detection means such as an encoder and which is controlled by a computer.

"Chips": virtual money used by players in order to express prediction of a winning number. One "chip" has a predetermined amount of credit or a point.

"Betting board": a virtual table on which chips are arranged to express prediction of a winning number of players.

"Betting": expressing a player's prediction of a winning number, and specifically, arranging chips on the betting board.

"Betting position": a position at which chips are arranged on the betting board. Different betting positions are set depending on the types of games.

"Betting quantity": the total amount of credits or the total number of points of the chips arranged at the same betting position and the subtotal number of chips arranged at the same betting position by the same player or the total number of chips arranged at the same betting position by all players.

"Betting situation": a situation of what betting quantity arranged at what betting position on the betting board.

Configuration An embodiment of the present disclosure relates to a roulette game system configured to implement a roulette game.

FIG. 1 is a system block diagram illustrating an exemplary preferable embodiment of a roulette game system according to the present disclosure. As illustrated in FIG. 1, the roulette game system 1000 according to this embodiment comprises a roulette lottery apparatus 100, station units 200-N (hereinafter, simply referred to as "station unit 200" when the station unit does not need to be identified), and a master unit 300. The roulette lottery apparatus 100, each station unit 200-N, and the master unit 300 are connected to each other via a network 400 such as a local area network (LAN), a wide area network (WAN), or the Internet in a wired and/or wireless communication manner. The network 400 may be either a wireless LAN or a wired LAN or a combination thereof. A wireless LAN device or a wired LAN device may be installed in the units or may be connected as an external device such as a LAN card.

Figure 2:
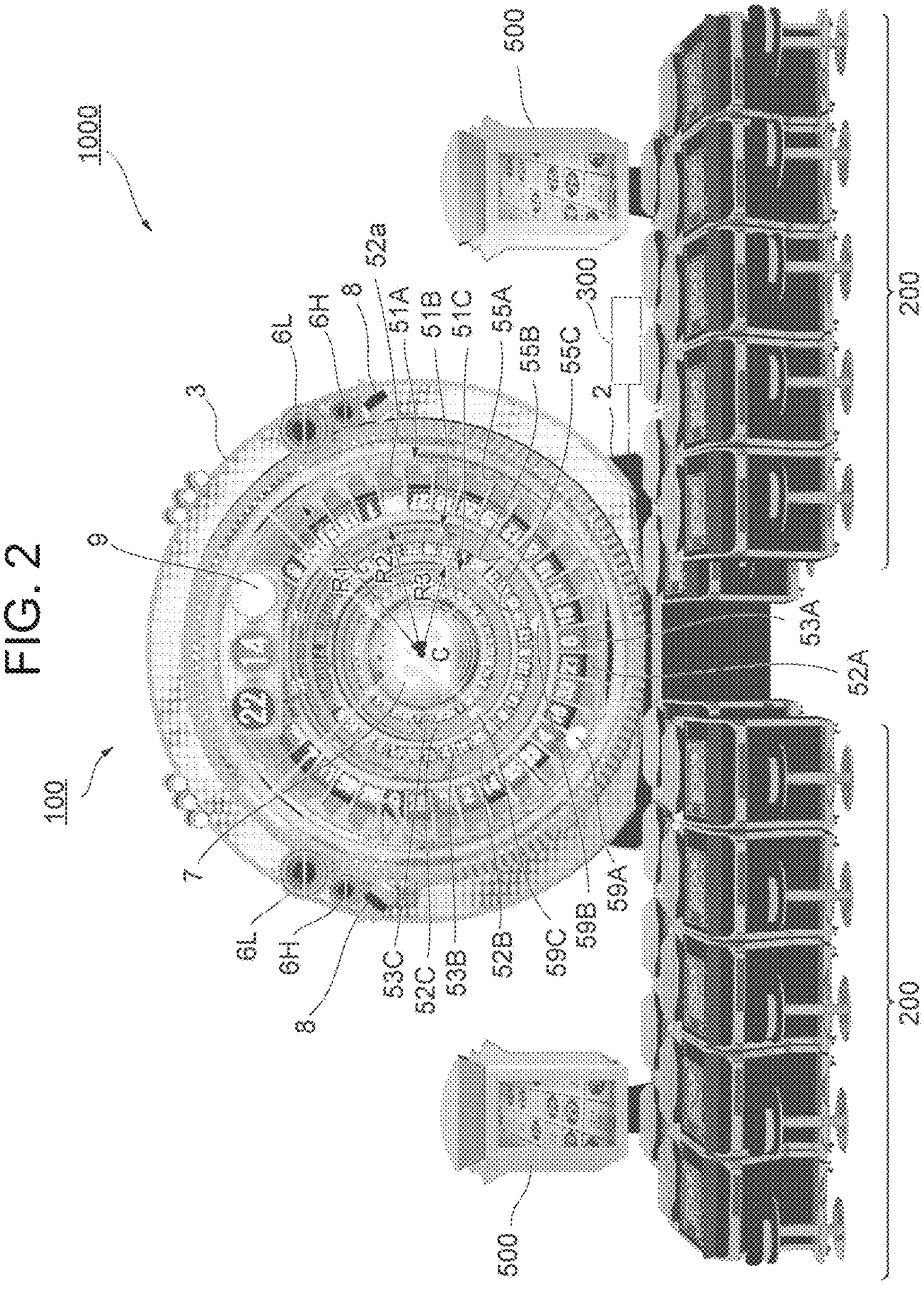
FIG. 2 is an entire external pictorial perspective view diagram illustrating a configuration example of the roulette game system.
Figure 3:
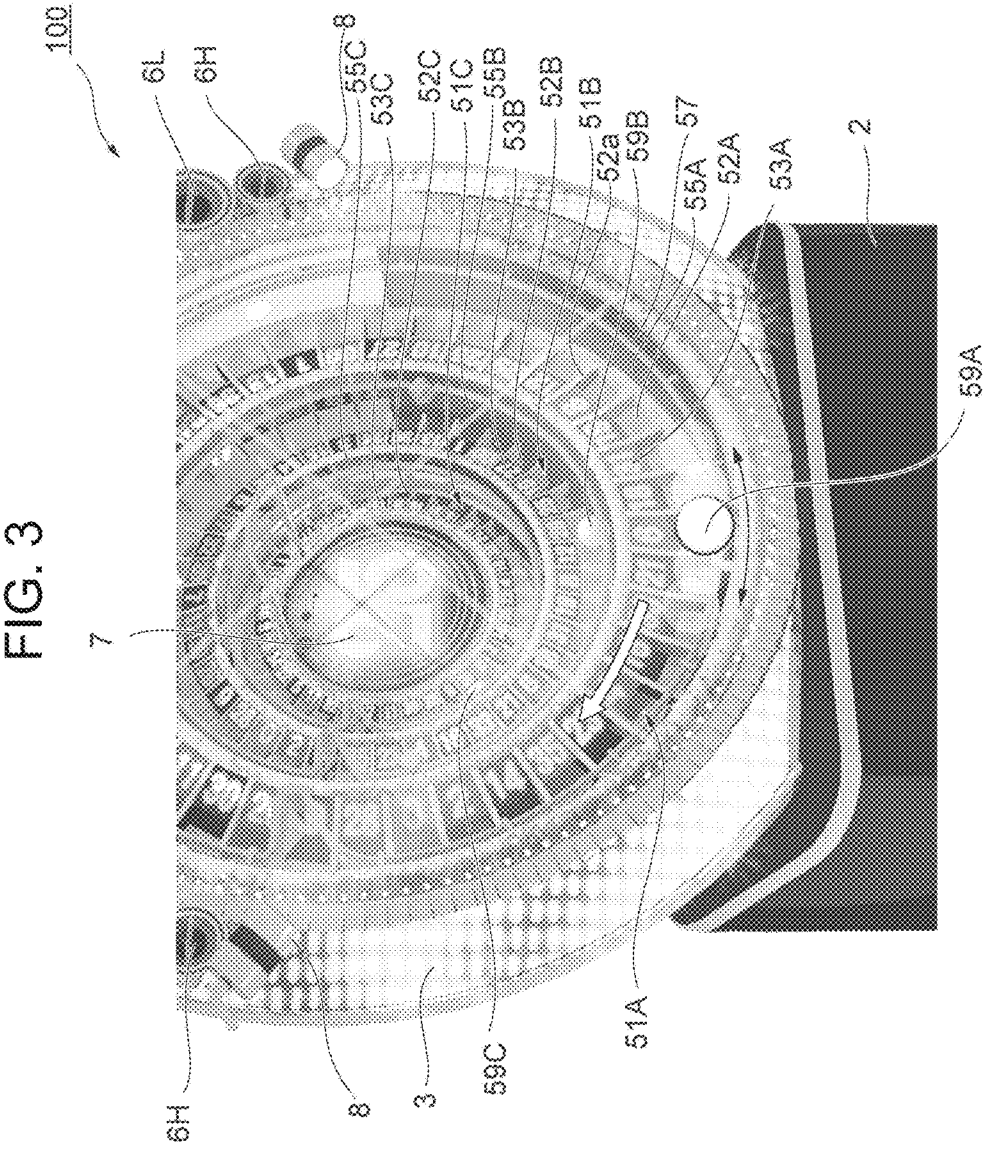
FIG. 3 is a pictorial perspective diagram illustrating a roulette lottery apparatus at the time of a lottery when viewed from an oblique front side.

FIG. 2 is an entire external view illustrating a configuration example of the roulette game system 1000 according to this embodiment. FIG. 3 is a perspective view illustrating the roulette lottery apparatus 100 at the time of lottery. As illustrated in FIG. 2, the roulette game system 1000 has a configuration in which the roulette lottery apparatus 100 is centered, the roulette lottery apparatus 100 is visibly arranged in the center, and the plural station units 200 are arranged on the front, right, and left sides thereof. Side monitors 500 are disposed on the front side of the plural station units 200 which are on the right and left sides of the roulette lottery apparatus 100. The roulette lottery apparatus 100 is fixed onto a base 2.

The roulette lottery apparatus 100 is lottery means for performing a lottery operation based on a rule of a roulette game. Each station unit 200 is an operation-display console at which a player sits and performs a betting operation based on a predicted winning roulette number.

The master unit 300 is a server unit configured to control a roulette lottery in the roulette lottery apparatus 100, to receive betting situations of the station units 200 and other operation information so as to be updated, and to transmit a combined operation situation in which the received information pieces are combined.

Depending on details of a game system, the master unit 300 may be omitted and the roulette lottery apparatus 100 and the plural station units 200 may be connected to each other to construct a game system. The master unit 300 has only to communicate with the station units 200 and the roulette lottery apparatus 100 and the installation position thereof is not particularly limited, but it is preferable that the master unit be installed in the base 2 of the roulette lottery apparatus 100 or the like. Since the roulette lottery apparatus 100 is visually symbolic of the roulette game system 1000, the roulette lottery apparatus 100 is arranged at the center of the system which can be viewed from any station unit 200. When the master unit 300 is installed in the base 2 of the roulette lottery apparatus 100 or the like, the network 400 with the station units 200 can be easily set up, the communication with the roulette lottery apparatus 100 can be simplified, and the connection to the side monitors 500 for displaying a live screen image is set up with a short distance, which is convenient.

In the below description, a side (side on which the station units 200 are arranged) on which players are located when viewed from the roulette lottery apparatus 100 is defined as a front side and the opposite side thereof is defined as a rear side, whereby the front-and-rear direction is defined. A direction perpendicular to the front-and-rear direction (direction connecting the front surface and the rear surface) in the horizontal plane is a right-and-left direction. In the roulette lottery apparatus 100, when plural devices and members having the same function and structure are present and the configurations of the respective devices and members are described, signs such as A, B, and C are added to the reference signs thereof. When the roulette bodies are described in common without identifying any roulette body, the signs such as A, B, and C are not added and only the numeral signs are described for explanation. For example, when any one of plural roulette bodies is identified in this embodiment, a "large roulette body 51A", a "middle roulette body 51B", and a "small roulette body 510" will be described. When an arbitrary roulette body is specified, a "roulette body 51" will be described.

As illustrated in FIG. 2, the roulette lottery apparatus 100 is configured to be visible to players and comprises a decorative frame 3, a central projector 7, a large roulette body 51A, a middle roulette body 51B, a small roulette body 51C, a large guide rail 55A, a middle guide rail 55B, and a small guide rail 55C. A support structure or the like which is not recognized by players will be described later.

The decorative frame 3 is a decorative panel covering the front surface of a fixing member 20 to be described later. Housing speakers 6H and 6L for a high-pitched tone and a low-pitched tone and illumination devices 8 are installed on the right and left sides of the decorative frame 3 and a history display unit 9 is installed on the upper side of the center thereof. The housing speakers 6H and 6L are sound generating means for outputting background music (BGM) or sound effects associated with the roulette game. The central projector 7 is a directing display for displaying a number as a lottery result whenever a new lottery result is issued. The illumination device 8 is illumination means for emitting a spotlight with the progress of the roulette game. The history display unit 9 is winning number display means for sequentially displaying three winning numbers which are the lottery results of the roulette games implemented in the large roulette body 51A, the middle roulette body 51B, and the small roulette body 51C.

The roulette bodies 51 are main constituents of the roulette games which are configured to rotationally move or to revolve about the same rotation center line C and correspond to the "rotating body" according to the present disclosure. A physical rotation axis is not set in the roulette bodies 51 and the roulette bodies are configured to rotationally move or rotate about a virtual rotation axis, that is, the "rotation center line" C. The guide rail 55 is guide means for guiding a ball 59 in an area including at least the lowest point of a circumferential area in which plural pockets 52 revolve and corresponds to the "guide mechanism" in the present disclosure.

Specifically, the large roulette body 51A comprises a large number display unit 53A and plural large pockets 52A partitioned by partitioning blades 52*a* at a position separated by a first distance R1 from the rotation center line C. The large number display unit 53A has a configuration in which N (where N is a natural number) number indicators are arranged continuously in the circumferential direction. The large pockets 52A are installed so as to cause one pocket to correspond to one number indicator and have a configuration in which N pockets are arranged continuously in the circumferential direction.

The middle roulette body 51B comprises a middle number display unit 53B and plural middle pockets 52B partitioned by partitioning blades 52*a* at a position separated by a second distance R2 from the rotation center line C. The middle number display unit 53B has a configuration in which N number indicators are arranged continuously in the circumferential direction. The middle pockets 52B are installed so as to cause one pocket to correspond to one number indicator and have a configuration in which N pockets are arranged continuously in the circumferential direction.

The small roulette body 51C comprises a small number display unit 53C and plural small pockets 52C partitioned by partitioning blades 52*a* at a position separated by a third distance R3 from the rotation center line C. The small number display unit 53C has a configuration in which N number indicators are arranged continuously in the circumferential direction. The small pockets 52C are installed so as to cause one pocket to correspond to one number indicator and have a configuration in which N pockets are arranged continuously in the circumferential direction.

As illustrated in FIG. 3, a ball 59 released from a ball release device 60 to be described later swings to the right and left sides along the plane of the guide rail 55, loses kinetic energy due to friction or the like, and the amplitude thereof slowly decreases. Then, the ball is dropped from the guide rail 55 and goes into any pocket 52 of the roulette body 51. The movement of the ball 59 at this time varies depending on various factors (such as the size, the weight, and the release speed of the ball 59, the size of the roulette body 51, the size of the ball pockets 52, the size or shape of the partitioning blades 52*a*, and the tilt angle of the rotation center line of the roulette body 51 to the rear side with respect to the horizontal plane), and the ball may smoothly go into any pocket 52 or may bound from the partitioning blades 52*a* and swing for a long time. The movement of the ball 59 is greatly different from that in the conventional roulette game apparatus and can give fresh or interesting impressions to players viewing the movement of the ball. The guide rails 55 are respectively provided with drop-preventing guards 57 for preventing drop of the ball 59.

Summary of Roulette Game

The roulette game system 1000 according to this embodiment provides a game having a new aspect of interest, for example, in which plural players sit at the station units 200 and simultaneously enjoy roulette games based on the lottery results obtained from a single roulette lottery apparatus 100 while operating the station units.

Figure 4:
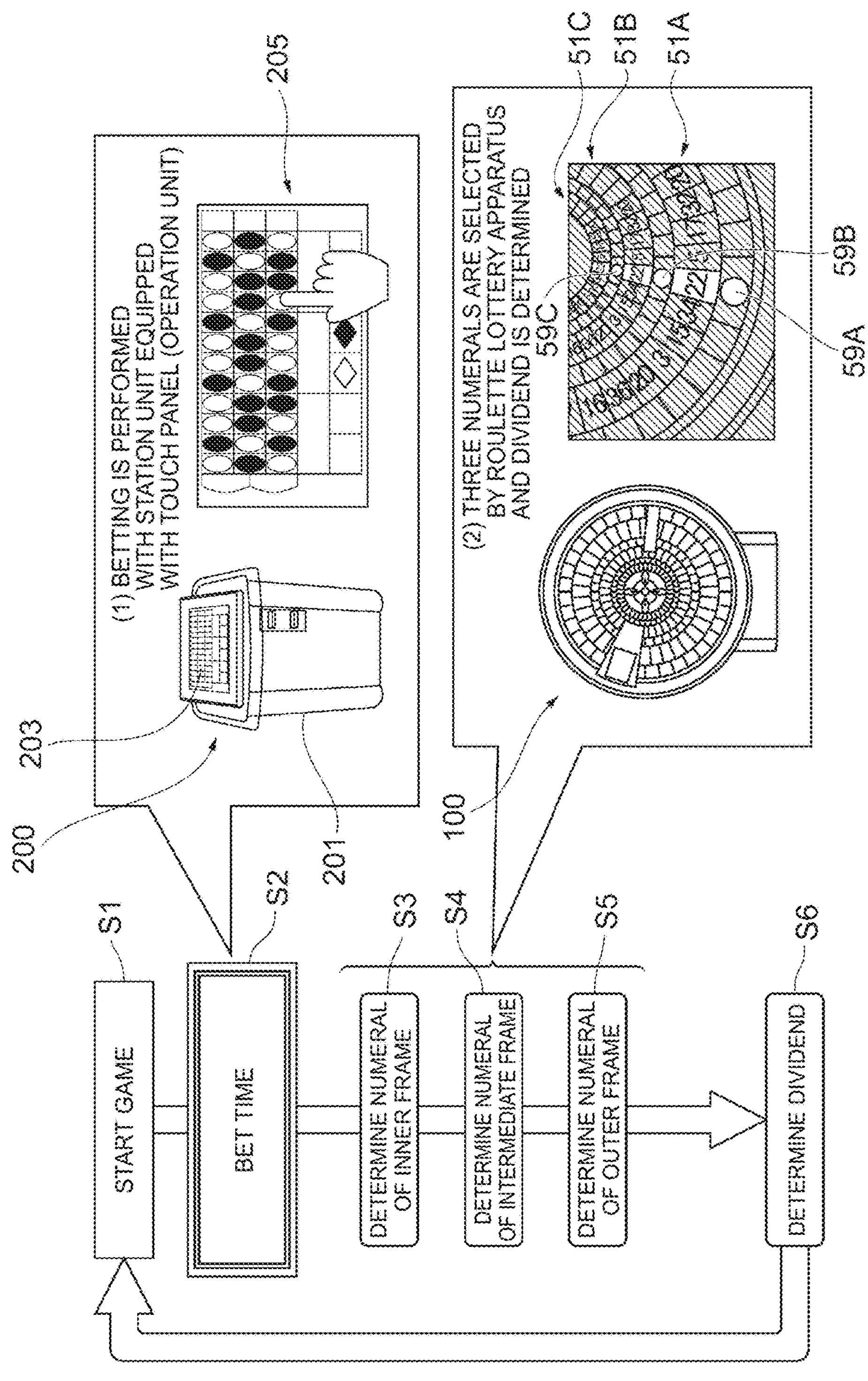
FIG. 4 is a combined flowchart pictorial diagram illustrating an example where a game flow in the roulette game system along with a state where a betting operation is performed with a station unit at the time of betting and a state of a roulette body or the like in the roulette lottery apparatus at the time of lottery.

FIG. 4 illustrates the summary of the roulette game in the roulette game system 1000. The flowchart on the left side of FIG. 4 illustrates a flow of a first round of the roulette game, the upper-right part thereof illustrates a betting situation in the station unit 200, and the lower-right part thereof illustrates the lottery state of the roulette bodies 51 in the roulette lottery apparatus 100.

As illustrated in the flowchart on the left side of FIG. 4, a first round of the roulette game according to this embodiment roughly comprises a betting mode (S1 and S2), a lottery mode (S3 to S5), and a dividend payment mode (S6).

Betting Mode

First, when the roulette game is started in step S1, the master unit 300 sets a betting period of a predetermined time length in step S2. A player sitting at each station unit 200 predicts winning numbers in the roulette bodies 51 while watching a betting table (operation unit) 205 displayed on a display unit 203 disposed in a housing 201 of the corresponding station unit 200, operates the operation unit 205, and bets the predicted winning numbers. The predicted winning number is transmitted as a betting situation to the master unit 300. The master unit 300 combines the betting situations in the station units 200 and displays the combined betting situation as a live screen image on the side monitors 500. In this embodiment, the operation unit 205 is formed as a touch panel superimposed on the display unit 203, but other types of input means such as a track ball, a joystick, and a keyboard may be used.

Lottery Mode

When the betting period ends, the master unit 300 inhibits the betting operations in the station units 200 and starts a lottery operation in the roulette lottery apparatus 100. First, in step S3, the lottery operation in the large roulette body 51A is performed, and the number of the large number display unit 53A corresponding to the large pocket 52A into which the large ball 59A injected into the large guide rail 55A goes is determined as a first winning number and is displayed on the history display unit 9. Subsequently, in step S4, the lottery operation in the middle roulette body 51B is performed, and the number of the middle number display unit 53B corresponding to the middle pocket 52B into which the middle ball 59B injected into the middle guide rail 55B goes is determined as a second winning number and is displayed on the history display unit 9. Subsequently, in step S5, the lottery operation in the small roulette body 51C is performed, and the number of the small number display unit 53C corresponding to the small pocket 52C into which the small ball 59C injected into the small guide rail 55C goes is determined as a third winning number and is displayed on the history display unit 9.

Dividend Payment Mode

A combination of the winning numbers of three roulette games is determined in this way, and the master unit 300 calculates dividends depending on the betting situations of the players transmitted from the station units 200 and transmits the total dividend to the station units 200 in step S6. The respective station units 200 perform payments of chips to the players or the like.

Roulette Lottery Apparatus

Figure 5:
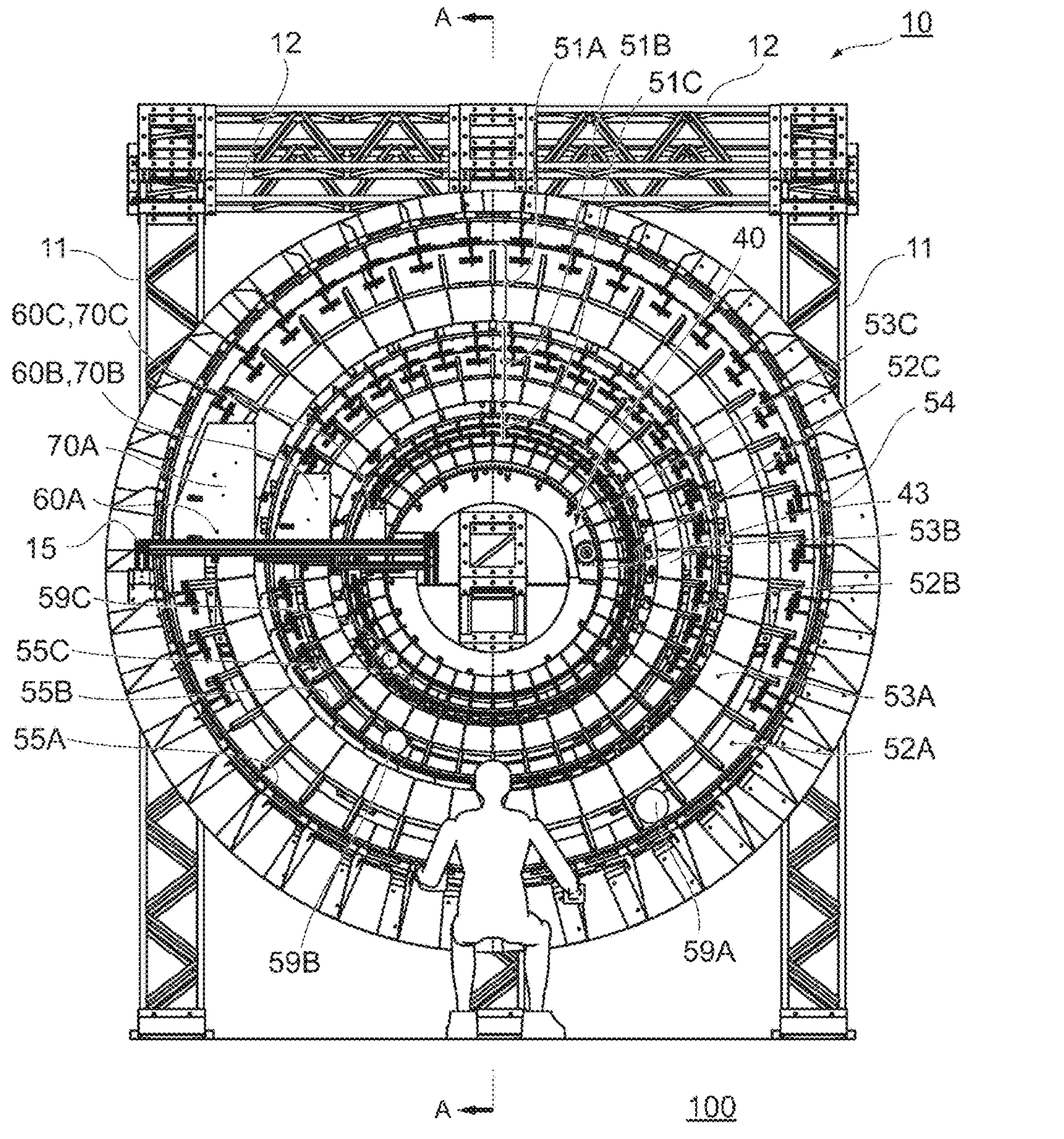
FIG. 5 is a front view diagram illustrating an internal structure of the roulette lottery apparatus.
Figure 6:
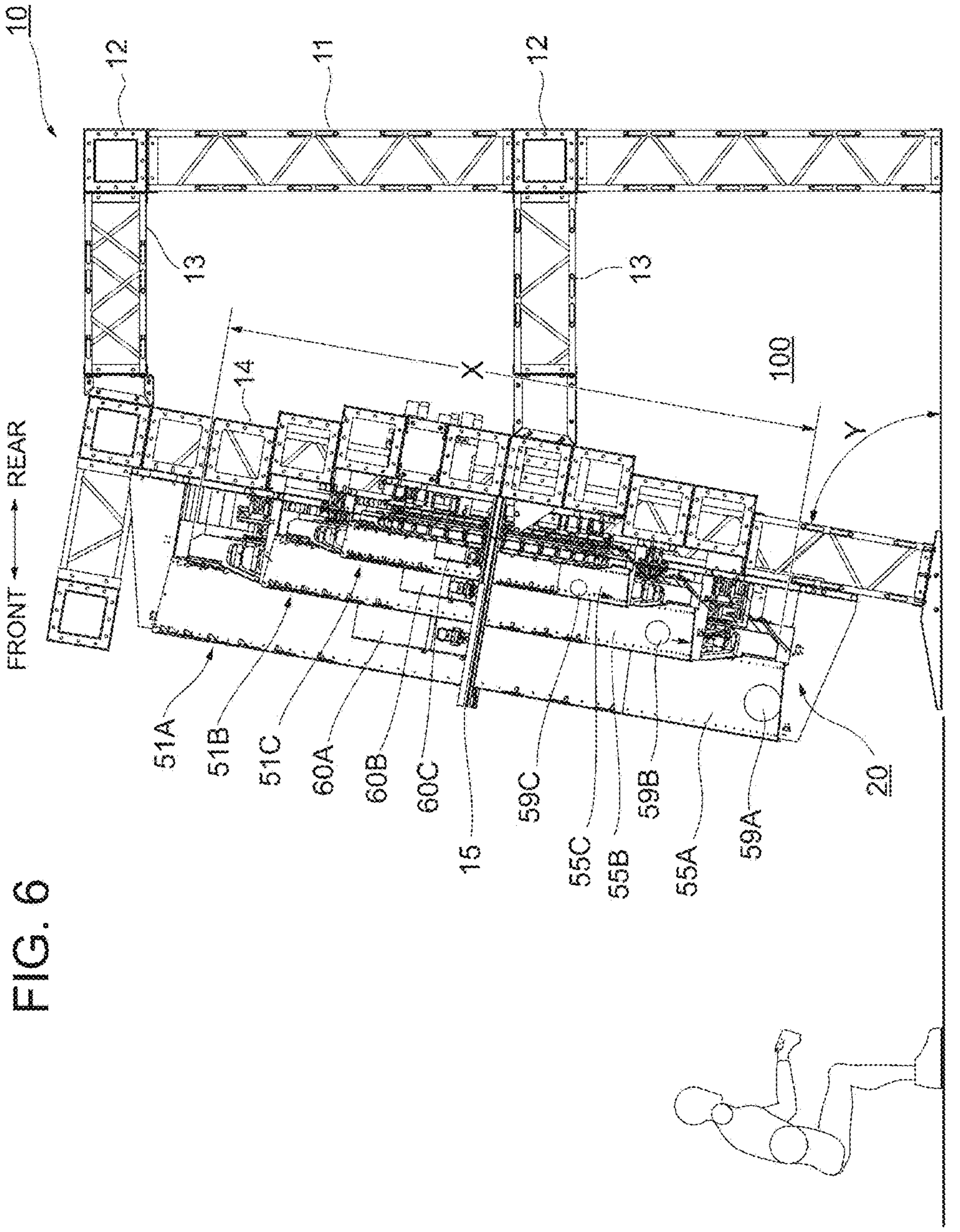
FIG. 6 is a cross-sectional view diagram taken along line A-A of FIG. 5, which illustrates the internal structure of the roulette lottery apparatus.
Figure 7:
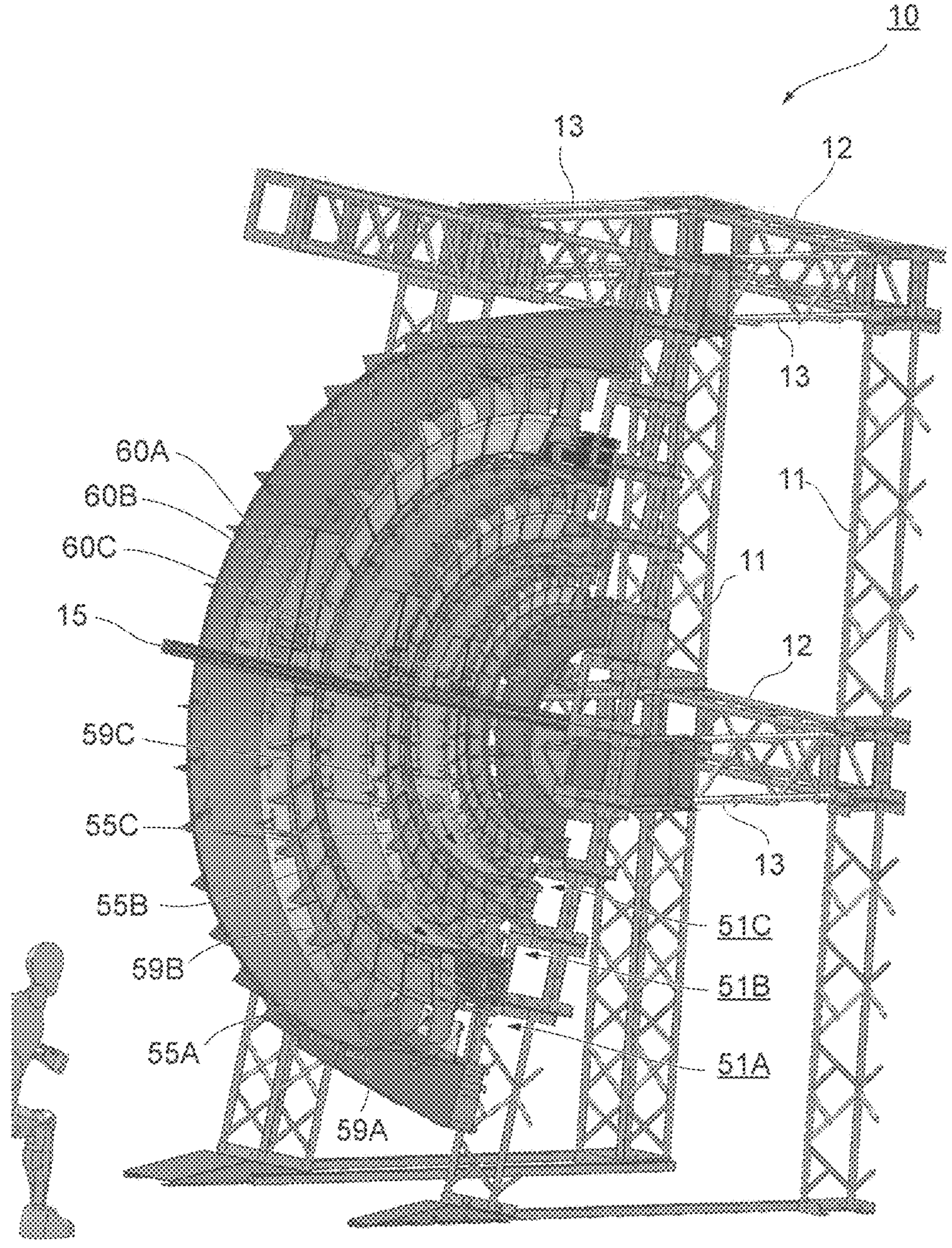
FIG. 7 is a perspective view diagram illustrating the internal structure of the roulette lottery apparatus 100, which includes a cross-section taken along line A-A of FIG. 5.
Figure 8:
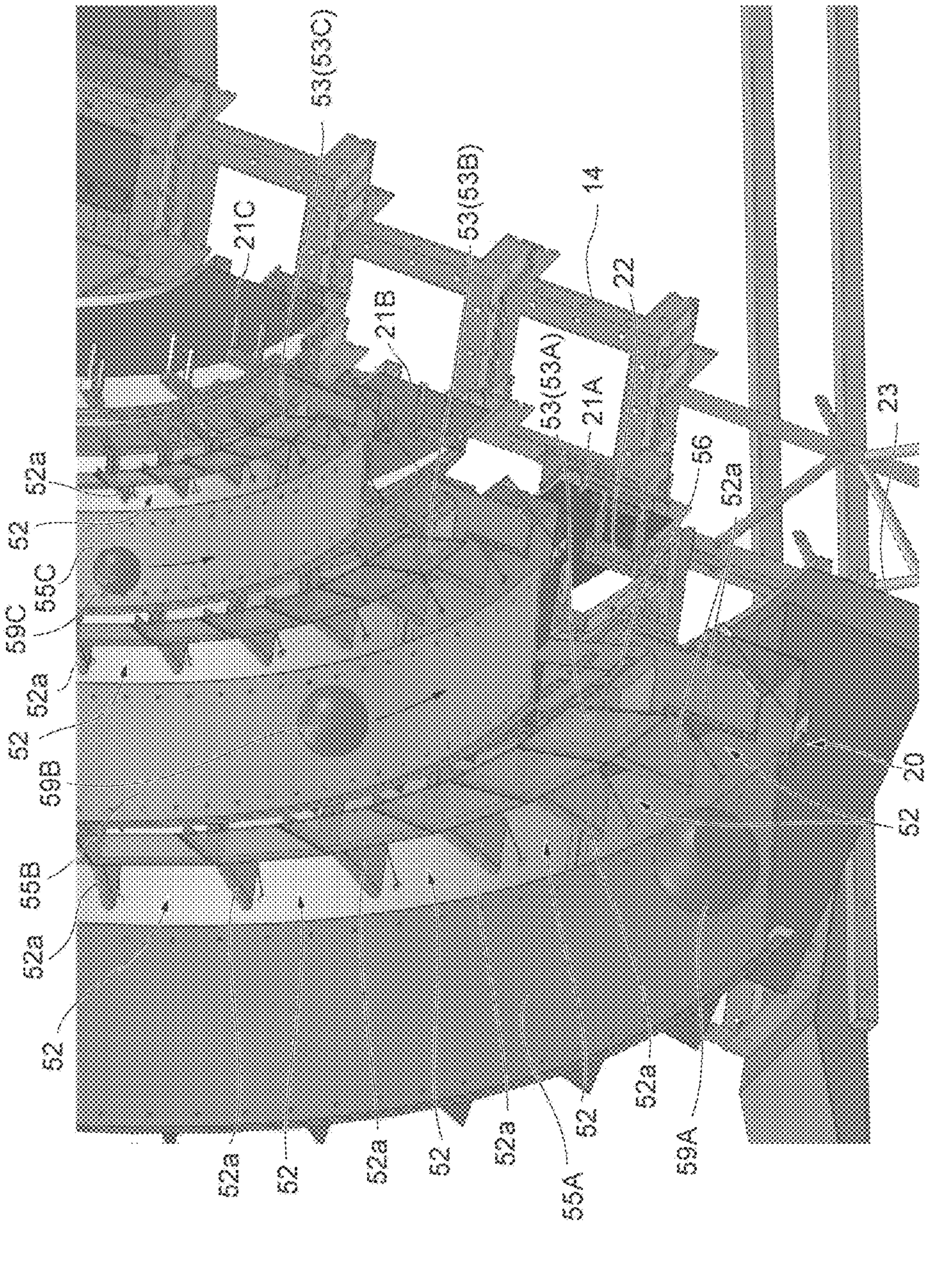
FIG. 8 is a perspective view diagram illustrating a detailed configuration around a ball rail in which a part of FIG. 7 is enlarged.

FIG. 5 is a front view illustrating the internal structure of the roulette lottery apparatus 100. FIG. 6 is a cross-sectional view taken along line A-A of FIG. 5. FIG. 7 is a perspective view of a cross-section taken along line A-A of FIG. 5, which illustrates the internal structure of the roulette lottery apparatus 100. FIG. 8 is a diagram illustrating a detailed configuration around the guide rail in which a part of FIG. 7 is enlarged.

As illustrated in FIG. 5, the roulette lottery apparatus 100 has a configuration in which the large roulette body 51A, the middle roulette body 51B, and the small roulette body 51C are supported by a support frame 10 as a support structure. The support frame 10 comprises a vertical frame 11 in the vertical direction and a horizontal frame 12 in the horizontal direction as illustrated in FIG. 5. As illustrated in FIG. 6, the support frame 10 comprises a tilt frame 14 supporting the roulette bodies 51 from the rear side and a front-and-rear frame 13 supporting the tilt frame 14 from the rear surface side. As illustrated in FIG. 6, in the roulette lottery apparatus 100 according to this embodiment, the rotation center line of the roulette bodies 51 is tilted by 10° (Y=80°) with respect to the horizontal plane. By slightly tilting the rotation center line, the trajectory of the ball 59 swinging in the guide rail 55 can be limited to a predetermined range. The outer diameter of the roulette lottery apparatus 100 is set to, for example, about 3 m. By setting the outer diameter to this large value, it is possible to astonish the players to feel visually funny.

In FIGS. 5 to 7, the ball release devices 60A, 60B, and 60C are fixed to the mounting frame 15. The ball release device 60A is release means for injecting the large ball 59A to a predetermined position of the guide rail 55A. The ball release device 60B is release means for injecting the middle ball 59B to a predetermined position of the middle guide rail 55B. The ball release device 60C is release means for injecting the small ball 59C to a predetermined position of the small guide rail 55C. The ball release devices 60 is configured to release the balls 59 to the guide rails 55 at the timing controlled by a ball release control unit 84 to be described later. It is preferable that the positions in the guide rails 55 into which the balls 59 are injected by the ball release devices 60 be set to positions at which the balls 59 swing on the guide rails 55 in the circumferential direction due to gravity acting on the balls 59, for example, positions around a 9:00 position in the front view illustrated in FIG. 5. As the injection position moves from the vicinity of the 9:00 position to a 6:00 position, the influence of gravity acting on the balls 59 is alleviated and the swinging range tends to be narrowed. As the injection position moves from the vicinity of the 9:00 position to a 12:00 position, the balls 59 immediately after the release may freely fall, and may collide with the guide rails 55 to damage the guide rails or may bound and be dropped. The detailed structure of the ball release devices 60 will be described later with reference to FIGS. 9 and 10.

The ball reset devices 70 are arranged at positions facing the ball release devices 60 with the roulette bodies 51 interposed therebetween. When the large ball 59A going into one pocket 52A in the large roulette body 51A is reloaded with the rotation of the large roulette body 51A, the ball reset device 70A is extrusion means for extruding and loading the large ball 59A in the pocket 52A to the ball release device 60A. When the middle ball 59B going into one pocket 52B in the middle roulette body 51B is reloaded with the rotation of the middle roulette body 51B, the ball reset device 70B is extrusion means for extruding and loading the middle ball 59B in the pocket 52B to the ball release device 60B. When the small ball 59C going into one pocket 52C in the small roulette body 51C is reloaded with the rotation of the small roulette body 51C, the ball reset device 70C is extrusion means for extruding and loading the small ball 59C in the pocket 52C to the ball release device 60C. The detailed structure of the ball reset devices 70 will be described later with reference to FIGS. 11 and 12.

In FIG. 5, drive systems 40 are drive means for rotationally driving the roulette bodies 51 and each comprise a roulette body drive motor 41 (see FIG. 13), an output shaft not illustrated, and a sprocket (pinion) attached to the output shaft. In the drive systems 40, the sprocket is attached to an inner wheel gear (not illustrated) disposed in an inner wheel of the roulette body 51 to engage with each other and the roulette bodies 51 can be made to rotate in the clockwise direction or the counterclockwise direction with the driving of the roulette body drive motor 41. The drive system 40A drives the large roulette body 51A, the drive system 40B drives the middle roulette body 51B, and the drive system 40C drives the small roulette body 51C. In FIG. 5, only the drive system 40C is illustrated.

The drive systems 40 are provided with encoders 43 to be described later. The encoders 43 are rotation detecting means for detecting rotation angles from the reference positions $\theta_0$ of the roulette bodies 51. The encoder 43A detects the rotation angle from the reference position of the large roulette body 51A, the encoder 43B detects the rotation angle from the reference position of the middle roulette body 51B, and the encoder 43C detects the rotation angle from the reference position of the small roulette body 51C.

As illustrated in FIG. 8, the wheel bases 21 are directly attached to the tilt frame 14. The roulette bodies 51 are fixed to the wheel bases 21 at plural positions with plural brackets 22 interposed therebetween. Plural fixing members 20 are attached at constant intervals to the fixed base 23, and the large guide rail 55A is fixed to the plural fixing members 20 so as to be supported at plural positions. The middle guide rail 55B is fixed to the wheel base 21A so as to be supported at plural positions. The small guide rail 55C is fixed to the wheel base 21B so as to be supported at plural positions.

The number display units 53 have a configuration in which plural number plates are arranged continuously. One number plate has a substantial trapezoidal shape formed of a transparent member such as resin or glass, the long sides thereof are fixed to the structural members of the roulette bodies 51, and two sides in contact with the long sides are in contact with the neighboring number plates. In each number plate, the background part is painted in a general color of a roulette numeral, for example, red or black, the background parts of numerals “0” and “00” are painted in green, and the numeral part is painted in a color easily recognizable by players, for example, white.

Plural light-emitting diodes (LEDs) 56 are arranged continuously in the circumferential direction behind the number display units 53. The LEDs 56 are configured to arbitrarily change whole lighting, half lighting, and extinction in the unit of the number plates under the control of a roulette body control unit 83 to be described later.

In FIGS. 5 to 8, the large ball 59A, the middle ball 59B, and the small ball 59C are illustrated to swing together, but the present disclosure is not limited to this example. For example, in the operations of this embodiment, the middle ball 59B is injected and swings after the small ball 59C goes into any of the plural small pockets 52C of the small roulette body 51C, and the large ball 59A is injected and swings after the middle ball 59B goes into any of the plural middle pockets 52B of the middle roulette body 51B. When plural roulette bodies 51 are present, directing in which the ball 59 is released in the next roulette body 51 after the ball 59 in one roulette body 51 goes into a pocket 52 to determine a winning number gives the same effect as winning number presentation of a lottery of sequentially arranging the winning numbers and thus can vigorously excite the players.

Ball Release Device 60

The ball release devices 60 are devices for releasing and shooting the balls 59 in a standby state at the time of roulette lottery and correspond to the "lottery ball injecting mechanism" in the present disclosure. The ball release devices 60 according to this embodiment are fixed to the support frame 10 via the mounting frame 15 at positions suitable for releasing the balls 59 held therein to the guide rails 55, for example, at positions around the 9:00 position when facing the roulette bodies 51 (see FIGS. 5 to 7). A configuration example of the ball release devices 60 will be described below.

Figure 9:
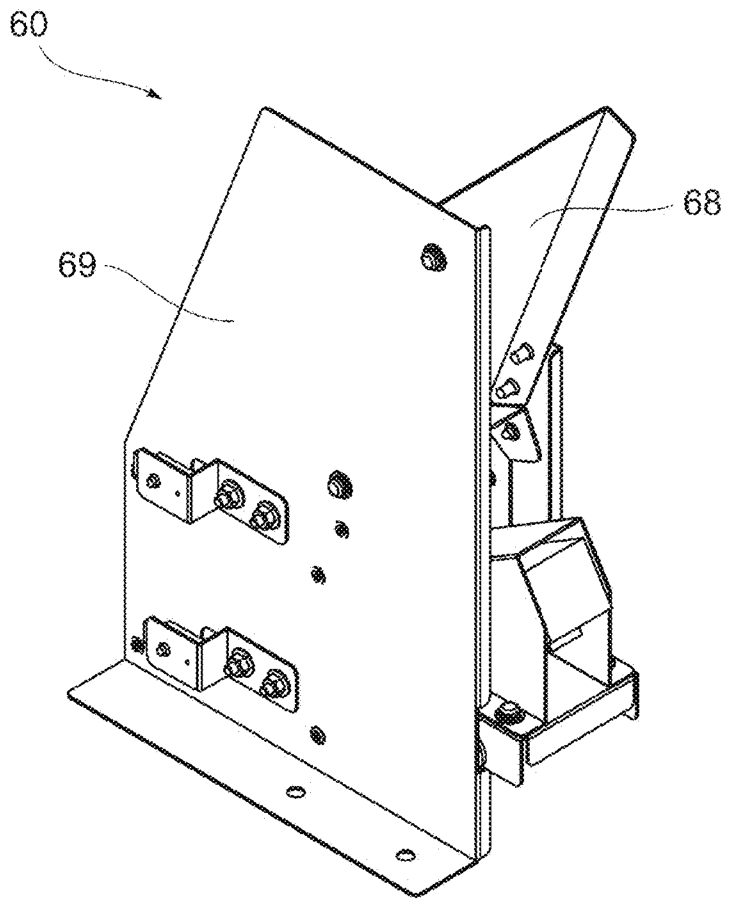
FIG. 9 is a perspective view illustrating a ball release device.
Figure 10:
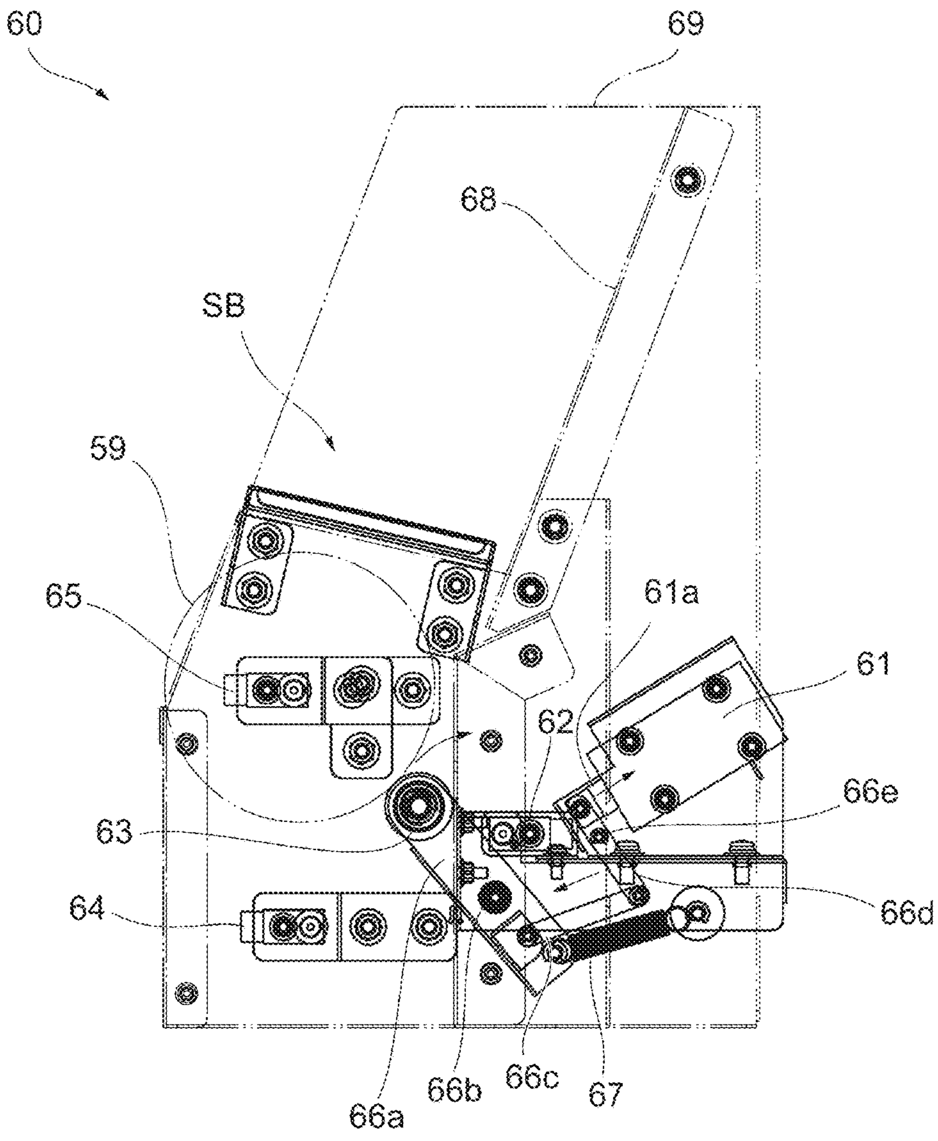
FIG. 10 is a side view diagram illustrating an internal configuration of the ball release device.

FIG. 9 is a perspective view illustrating a ball release device 60 according to this embodiment. FIG. 10 is a diagram illustrating the internal configuration of the ball release device 60 according to this embodiment. As illustrated in FIG. 10, the ball release device 60 comprises members such as a solenoid 61, a solenoid sensor 62, a roller 63, a release sensor 64, a setting sensor 65, a roller support lever 66*a*, a link, 66*c*, a transmission lever 66*d*, and a coil spring 67. As illustrated in FIG. 9, these members are mounted on a mounting plate 68 in which two plate-like members are combined with an angle and a cover plate 69 disposed on the front side of the roulette lottery apparatus 100 when viewed from the mounting plate 68. A passing space of the ball 59 is formed in the mounting plate 68 and the cover plate 69.

The solenoid sensor 62 is a sensor for detecting the roller 63 or the roller support lever 66*a* retreating from the ball passing space and is detection means for detecting a predetermined operation of the roller 63. The setting sensor 65 is detection means for detecting presence of the ball 59 at a standby position SB. The release sensor 64 is disposed in the vicinity of a ball-falling hole in the ball release device 60 and is detection means for detecting that the ball 59 is released and falls.

As illustrated in FIG. 10, the roller 63 regulating the ball 59 is attached to the tip of the roller support lever 66*a* which is rotatable about a pivot 66*b*. The roller support lever 66*a* is in a state (standby state) in which the base end thereof is drawn and biased with the coil spring 67 and the roller 63 protrudes into the pass space of the ball 59. The roller support lever 66*a* is connected to a plunger 61*a* of the solenoid 61 via the link 66*c* and the transmission lever 66*d*.

A series of operations of the ball release device 60 can be simply arranged as follows. First, under the control of the ball release control unit 84 of the control unit 80 to be described later, when the solenoid 61 is supplied with power, the plunger 61*a* is drawn in the direction of the arrow in FIG. 10, the transmission lever 66*d* swings in the clockwise direction in FIG. 10 about the pivot 66*e*, and movement is transmitted to the roller support lever 66*a* via the link 66*c*. The roller support lever 66*a* to which movement is transmitted swings in the clockwise direction about the pivot 66*b* and causes the roller 63 to retreat from the ball passing space in the direction of the arrow in FIG. 10. When the roller 63 retreats, the ball 59 in the standby state is released from constraint and the ball 59 falls, that is, is released.

The ball 59 released from the ball release device 60 swings to right and left along the plane of the guide rail 55, loses kinetic energy due to friction or the like, and slowly decreases the amplitude, finally falls from the guide rail 55, and goes into any pocket 52 of the roulette body 51 (see FIG. 3). Thereafter (for example, after the balls 59 go into the pockets 52 in all the three roulette bodies 51A to 51C and the winning numbers are determined), in order to recover the balls 59 in the pockets 52, the roulette bodies 51 rotate in the clockwise direction in FIG. 2 or 5 to move the balls 59 to the positions (recovery positions) just before the ball reset devices 70 under the control of the drive system control unit 82 of the control unit 80 to be described later.

Ball Reset Device 70

The ball reset device 70 is a device that extrudes the ball 59 moving to the recovery position to the front side of the roulette lottery apparatus 100 and moves and resets (returns to the standby state) the ball to the standby position SB. The ball reset device 70 according to this embodiment is fixed to the support frame 10 via a ball reset device-fixing frame not illustrated at a position suitable for extruding the ball 59 to the ball release device 60, for example, a position on the rear side of the ball release device 60. A configuration example of the ball reset device 70 will be described below.

Figure 11:
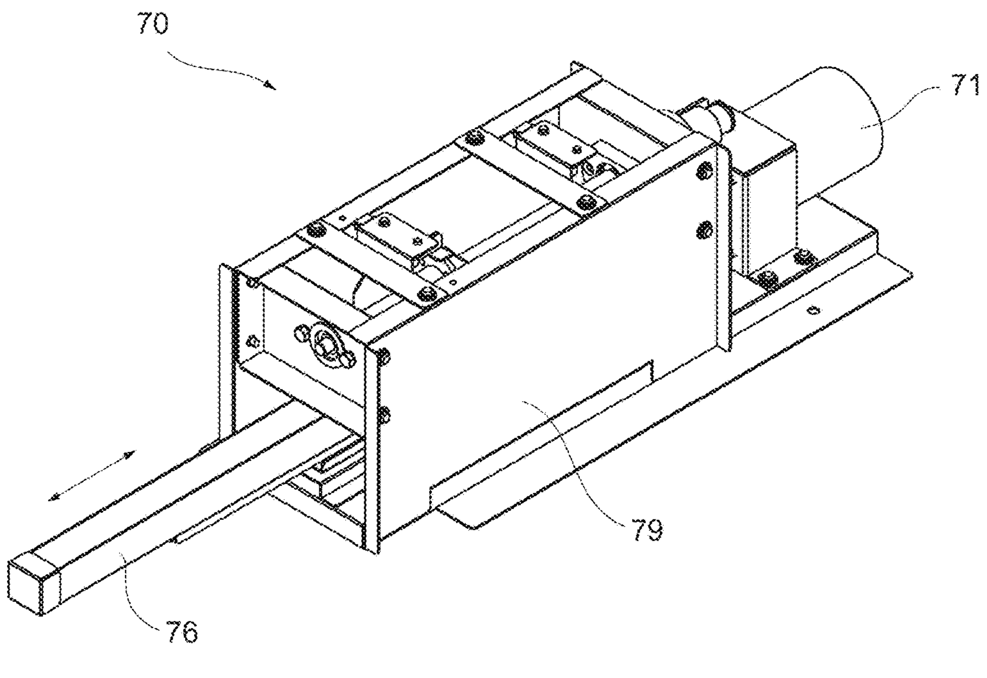
FIG. 11 is a perspective view diagram illustrating a ball reset device.
Figure 12:
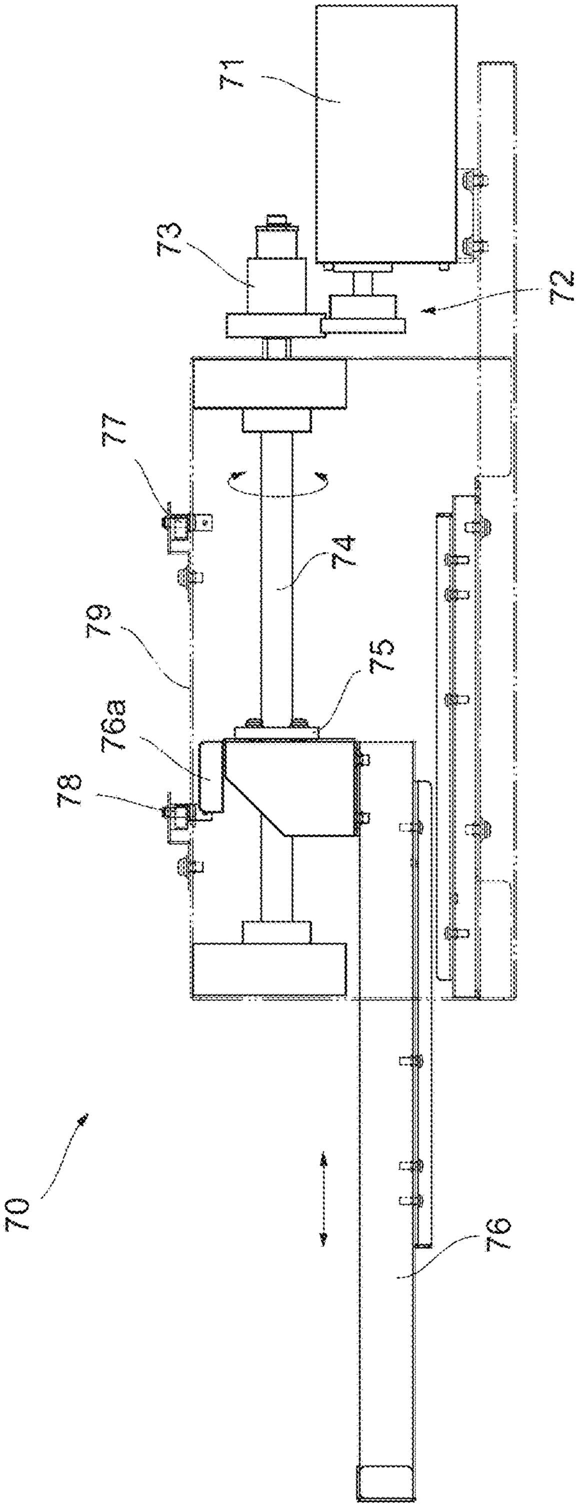
FIG. 12 is a side view diagram illustrating an internal configuration of the ball reset device.

FIG. 11 is a perspective view illustrating the ball reset device according to this embodiment. FIG. 12 is a diagram illustrating the internal configuration of the ball reset device according to this embodiment. As illustrated in FIG. 12, the ball reset device 70 comprises members such as a ball reset motor 71, a gear train 72, a torque limiter 73, a ball screw 74, a change nut 75, a ball extruding rod 76, a sensor dog 76*a*, a home sensor 77, and a limit sensor 78. These members are attached to the support frame 10 via a mounting frame member not illustrated.

The ball reset motor 71 transmits a drive force via the gear train 72 to rotate the ball screw 74. The ball screw 74 is rotatably supported by the mounting frame member 79 and moves the ball extruding rod 76 attached to the change nut 75 on the ball screw 74 forward and backward (to the front side or the rear side of the roulette lottery apparatus 100).

The ball extruding rod 76 moves forward to the front side from a home position (initial position) to extrude the ball 59 to the ball release device 60 and then moves backward to the rear side to return to the home position. The forward and backward movement of the ball extruding rod 76 is determined depending on the rotation direction (forward rotation or backward rotation) of the ball reset motor 71. The sensor dog 76*a* is attached to the ball extruding rod 76 and is configured to pass through any one of the home sensor 77 and the limit sensor 78 disposed in the mounting frame member 79.

The home sensor 77 detects that the ball extruding rod 76 moves backward to the home position. The limit sensor 78 detects that the ball extruding rod 76 moves forward to a predetermined ball extrusion position (limit position). The torque limiter 73 is attached to the shaft of the ball screw 74 and protects the ball extruding rod 76 and the ball reset motor 71 when problems such as overrun or overload occur.

A series of operations of the ball reset device 70 will be simply arranged as follows. First, it is checked whether the ball extruding rod 76 is located at the home position through the use of the home sensor 77. Then, the ball reset motor 71 is rotated to cause the ball extruding rod 76 to move forward. When the limit sensor 78 detects the sensor dog 76*a*, it is determined that the ball extruding rod 76 moves forward to the limit position, and the ball reset motor 71 is stopped. After a predetermined time passes, the ball reset motor 71 is reversely rotated to cause the ball extruding rod 76 to move backward. When the home sensor 77 detects the sensor dog 76*a*, it is determined that the ball extruding rod 76 returns to the home position, and the ball reset motor 71 is stopped.

Functional Blocks of Roulette Game System

Figure 13:
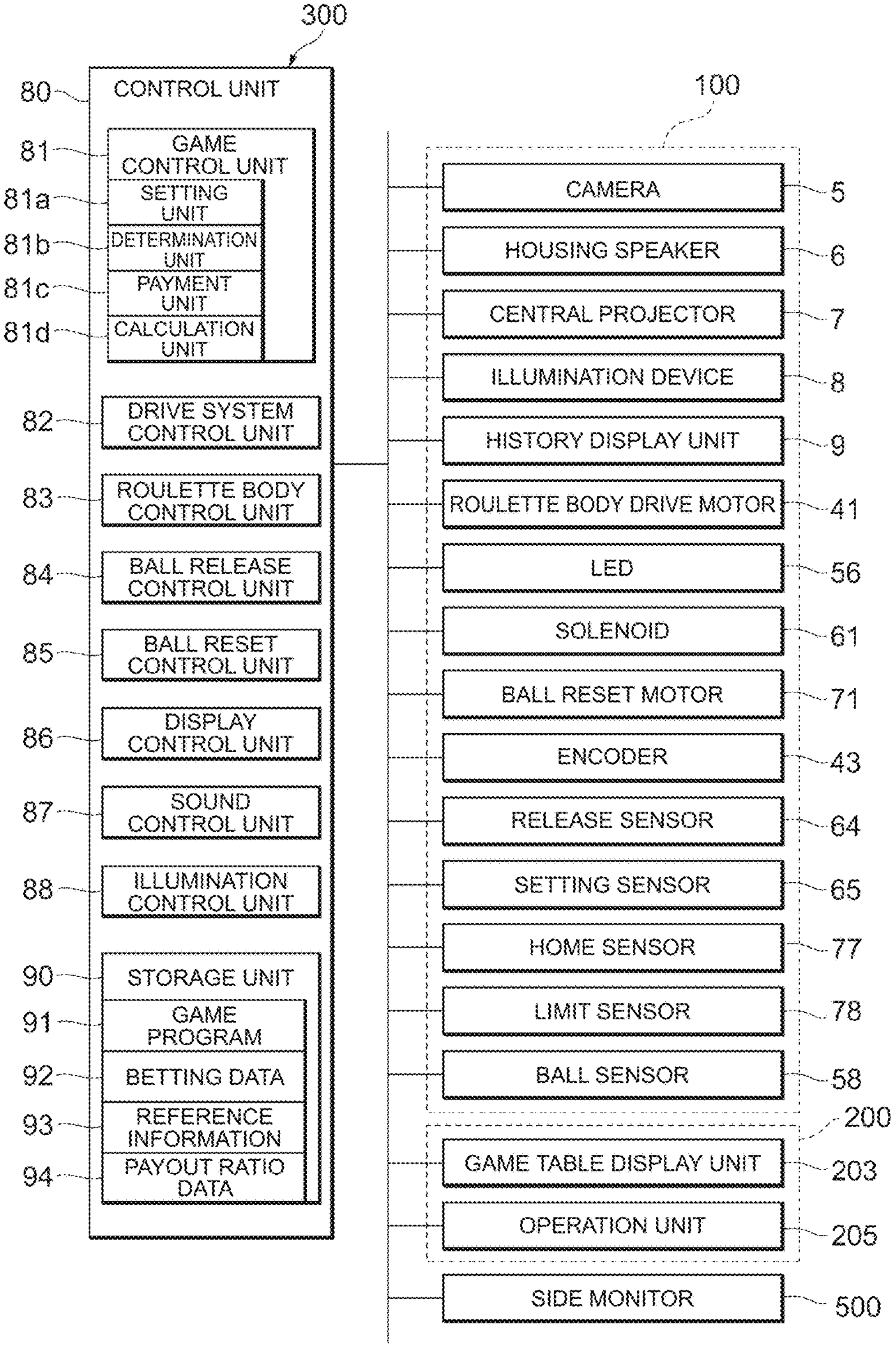
FIG. 13 is a block diagram illustrating the roulette game system.

FIG. 13 is a block diagram illustrating the roulette game system 1000. As illustrated in FIG. 13, the master unit 300 comprises a control unit 80 which is a computer device. The control unit 80 comprises a CPU, a RAM, a ROM, a large-capacity storage device, and an interface circuit which are not illustrated as hardware. The control unit 80 functionally comprises a game control unit 81, a drive system control unit 82, a roulette body control unit 83, a ball release control unit 84, a ball reset unit 85, a display control unit 86, a sound control unit 87, an illumination control unit 88, and a storage unit 90.

These functional blocks are only defined by conveniently dividing the functions performed by the master unit 300. Accordingly, plural functional blocks may be combined into a single functional block or a single functional block may be further divided into finer functional blocks. These functional blocks are embodied by causing the computer device to execute a predetermined computer software program, but a part or all of the functional blocks may be embodied by hardware.

The game control unit 81 is a functional block which is functionally embodied by causing the control unit 80 to execute a program module associated with the progress of a game out of the game program 91 stored in the storage unit 90 and comprises a setting unit 81*a*, a determination unit 81*b*, a payment unit 81*c*, and a calculation unit 81*d*.

The setting unit 81*a* controls the progress of the roulette game along the progress of the game and stores, reads, and changes data necessary for the progress of the game. For example, when the roulette game is in the betting mode, the setting unit 81*a* stores the betting situations of the players transmitted from the operation units 205 of the station units 200 as betting data 92 in the storage unit 90.

The determination unit 81*b* determines the winning number (the numeral corresponding to the ball pocket 52 into which the ball 59 goes) which is the lottery result of the roulette lottery apparatus 100 on the basis of the detection signal from the ball sensor 58. In addition, the determination unit 81*b* reads the betting data 92 stored in the storage unit 90, compares a predicted number of a player with the winning number with reference to the betting situations of the station units 200, and determines whether both numbers are equal to each other. The determination unit 81*b* determines whether the equality is established for each of the large roulette body 51A, the middle roulette body 51B, and the small roulette body 51C, and outputs a combination of three winning numbers.

The calculation unit 81*d* calculates the total dividend with reference to payout ratio data 94 stored in the storage unit 90. Examples of the payout ratio data 94 include odds data determined depending on the betting positions of the betting table and dividend cover data determined depending on the winning number for each betting position. Examples of odds include straight-up (betting of one point), split (betting of two points), street (betting of three points), corner (betting of four points), five number (betting of five points), line (betting of six points), column (betting of twelve points), dozen (betting of twelve points), low/high (betting of eighteen points), and even/odds (betting of eighteen points). The dividend cover is, for example, a ratio depending on one hit, two hits, and three hits. For example, when the odds is betting of one point, the dividend cover is set to 10 times in case of one hit, 50 times in case of two hits, and 5000 times in case of three hits. The calculation unit 81*d* specifies the odds O on the basis of the betting positions associated with the winning numbers, specifies the dividend cover N depending on how many roulette games the player wins, specifies a betting quantity A which is an amount of chips bet on the basis of the betting situations, calculates O×N×A, and determines the amount of money to be paid m for each chip. Then, the calculation unit 81*d* integrates the amount of money to be paid m for all the chips bet and calculates the total dividend M for each station unit 200.

The payment unit 81*c* transmits the total dividend M calculated by the calculation unit 81*d* to the respective station units 200. In each station unit 200, chips corresponding to the transmitted total dividend M are paid (credits are added).

The drive system control unit 82 is a functional block which is functionally embodied by causing the control unit 80 to execute a program module associated with the control of the drive system 40 of the roulette lottery apparatus 100 out of the game program 91 stored in the storage unit 90. The drive system control unit 82 specifies current positions of the roulette bodies 51 with reference to the detection signal from the encoder 43, outputs a control signal to the roulette body drive motor 41, and controls the roulette bodies 51 so as to operate in the specified rotation direction, at the specified rotation speed, at the specified start timing, and at the specified stop timing.

The roulette body control unit 83 is a functional block which is functionally embodied by causing the control unit 80 to execute a program module associated with the control of the roulette bodies 51 of the roulette lottery apparatus 100 out of the game program 91 stored in the storage unit 90. The roulette body control unit 83 determines the rotation directions and the rotation speeds of the large roulette body 51A, the middle roulette body 51B, and the small roulette body 51C and controls the drive system control unit 82 so as to drive the roulette bodies 51 in the determined rotation directions and at the determined rotation speeds. The roulette body control unit 83 determines the drive order of the large roulette body 51A, the middle roulette body 51B, and the small roulette body 51C and controls the drive system control unit 82 so as to drive the roulette bodies 51 in the determined drive order. In this embodiment, the roulette body control unit 83 determines that the small roulette body 51C, the middle roulette body 51B, and the large roulette body 51A are driven in this order, and initially starts the small roulette body 51C at a predetermined start timing. When it is detected that the small ball 59C first goes into a pocket 52 of the small roulette body 51C, the small roulette body 51C is stopped and then the middle roulette body 51B is started. Then, when it is detected that the middle ball 59B goes into a pocket 52 of the middle roulette body 51B, the roulette body control unit 83 stops the middle roulette body 51B and finally starts the large roulette body 51A. Then, when it is determined that the large ball 59A goes into a pocket 52 of the final large roulette body 51A, the final large roulette body 51A is stopped.

The ball release control unit 84 is a functional block which is functionally embodied by causing the control unit 80 to execute a program module associated with the control of the ball release device 60 of the roulette lottery apparatus 100 out of the game program 91 stored in the storage unit 90. The program module corresponds to the timing control program according to the present disclosure and will be described in detail in the section regarding Timing Control of Roulette Lottery Apparatus.

The ball reset control unit 85 is a functional block which is functionally embodied by causing the control unit 80 to execute a program module associated with the control of the ball reset device 70 of the roulette lottery apparatus 100 out of the game program 91 stored in the storage unit 90. When it is confirmed that the ball extruding rod 76 is located at the home position with reference to the detection signal from the home sensor 77 of the ball reset device 70, the ball reset control unit 85 supplies a drive signal to the ball reset motor 71 to rotate and causes the ball extruding rod 76 to move forward. Subsequently, when it is determined that the ball extruding rod 76 moves forward up to the limit position with reference to the detection signal from the limit sensor 78, the ball reset control unit 85 stops the supply of the drive signal to stop the ball reset motor 71. Subsequently, after a predetermined time passes, the ball reset control unit 85 supplies a drive signal to reverse the rotation of the ball reset motor 71, causes the ball extruding rod 76 to move backward, and stops the supply of the drive signal to stop the ball reset motor 71 when it is determined that the ball extruding rod 76 returns to the home position with reference to the detection signal from the home sensor 77.

The display control unit 86 is a functional block which is functionally embodied by causing the control unit 80 to execute a program module associated with the control of the central projector 7 and the history display unit 9 and the image control of the side monitors 500 of the roulette lottery apparatus 100 out of the game program 91 stored in the storage unit 90. When the ball 59 goes into a pocket 52 of any of the large roulette body 51A, the middle roulette body 51B, and the small roulette body 51C and the winning number is determined, the display control unit 86 displays the determined winning number on the central projector 7 for a predetermined time in the lottery mode. The display control unit 86 sequentially displays the determined winning numbers on the history display unit 9 in the lottery mode. The display control unit 86 combines the betting situations in all the station units 200 with reference to the betting data 92 of the storage unit 90, generates a simulated image (live screen image) in which all the players bet the chips on a single betting board, and displays the generated simulated image on the side monitors 500.

The sound control unit 87 is a functional block which is functionally embodied by causing the control unit 80 to execute a program module associated with the sound control of the housing speakers 6 of the roulette lottery apparatus 100 out of the game program 91 stored in the storage unit 90. The sound control unit 87 supplies a sound signal for outputting background music (BGM), sound effects, or voice with the progress of the roulette game to the housing speakers 6 to output sounds.

The illumination control unit 88 is a functional block which is functionally embodied by causing the control unit 80 to execute a program module associated with the control of the illumination devices 8 and the LEDs 56 of the roulette lottery apparatus 100 out of the game program 91 stored in the storage unit 90. The illumination control unit 88 controls the supply of power to the illumination devices 8 to control lighting, flickering, and extinction of the illumination devices 8. The illumination control unit 88 controls the supply of power to the LEDs 56 to control whole lighting, half lighting, and extinction in the unit of the number plate of the number display units 53.

Timing Control of Roulette Lottery Apparatus

The present disclosure is characterized in control of the timing of injecting (releasing) a ball in a roulette lottery apparatus. The operations of the ball release control unit 84 according to this embodiment will be described below in conjunction with an example.

The ball release control unit 84 is configured to perform the timing control method according to the present disclosure. Specifically, when the total number of pockets 52 is defined as N (where N is a natural number), the ball release control unit 84 controls the timing of injecting the ball 59 at an angle unit smaller than $2\pi/N$. This control will be described below in more detail with reference to FIGS. 14 to 17.

Figure 14:
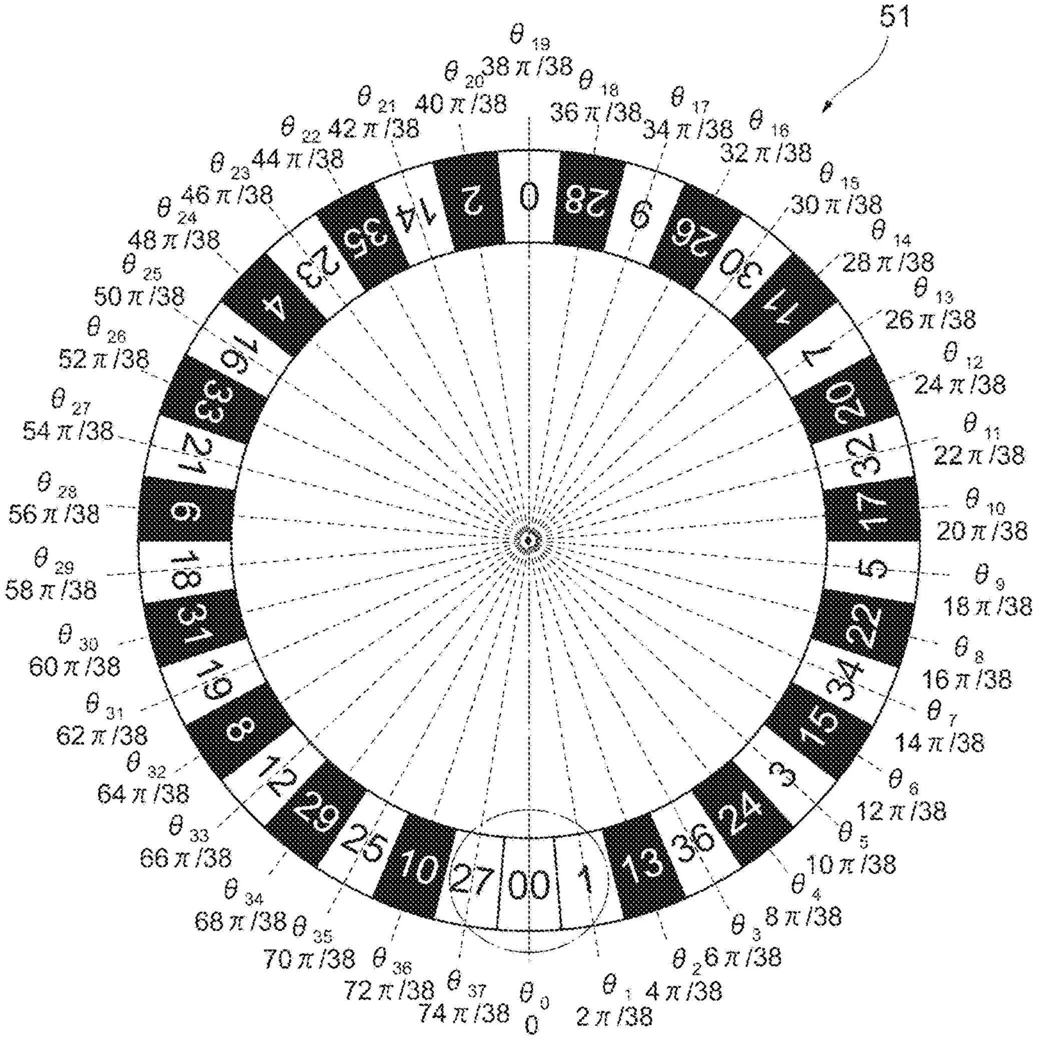
FIG. 14 is a basic pictorial view diagram illustrating an angle setting for number indication in the roulette body.

FIG. 14 is a basic diagram illustrating an angle setting for the number indicators in the roulette body 51. FIG. 14 is a conceptual diagram illustrating only the number indicators of the number display unit 53. As illustrated in FIG. 14, in this embodiment, the number display unit 53 of the roulette body 51 is provided with 38 numerals comprising natural numbers of "1" to "36" and additional numbers "0" and "00". The roulette provided with a combination of 38 numbers is generally referred to as an American style. A roulette provided with total 37 numbers comprising natural numbers of "1" to "36" and additional number "0" is also known. The roulette provided with a combination of 37 numbers is generally referred to as a European style. N=38 is set in the American style roulette, and N=37 is set in the European style roulette.

In order to specify the rotation position of the roulette body 51, it is considered that the rotation position is specified on the basis of displacement from a reference position. For example, when the displacement is defined as angle $\theta$ and the reference position $\theta_0$ is defined as the lowest position (the 6:00 position of the roulette body 51, the position of number "00" in FIG. 14), the angle $\theta_n$ ($0 \leq n \leq N-1$) of the n-th number from the reference position $\theta_0$ can be specified to be $\theta_n = n \cdot 2\pi/N$. It is necessary to determine in what direction of the clockwise direction and the counterclockwise direction to count the angle $\theta_n$ from the reference position $\theta_0$. As illustrated in FIG. 14, it is assumed that the angle is counted in the counterclockwise direction in this embodiment.

In order to locate a plate of a specific number at an arbitrary position, the rotation position of the roulette body 51 should be specified and controlled in drive at an angle unit $2\pi/N$. For example, when N=38 is set, it is necessary to specify the rotation position in the unit (resolution) of $2\pi/38$ and to control the driving as illustrated in FIG. 14.

Figure 15:
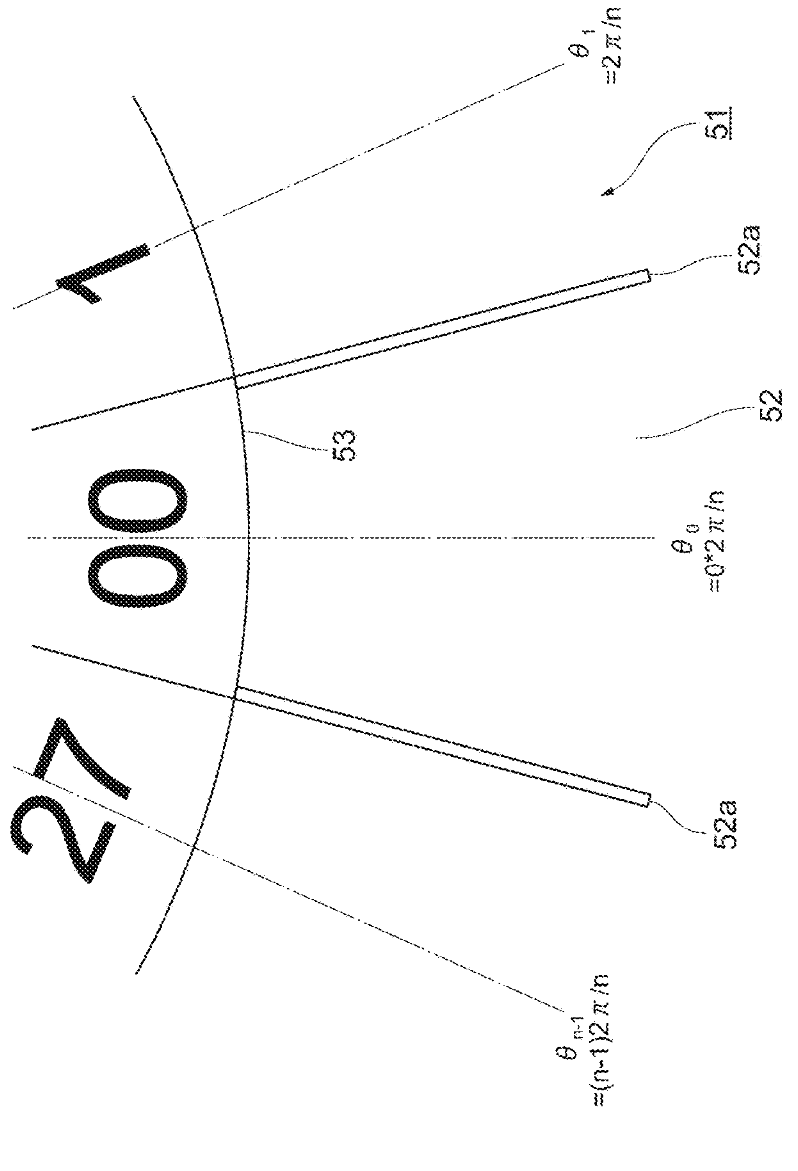
FIG. 15 is a partially enlarged pictorial view diagram illustrating the angle setting for number indication in the roulette body illustrated in FIG. 14, which shows a normal timing control example.

FIG. 15 is a partially enlarged view of a part surrounded with a circle in the vicinity of number "00" in FIG. 14. When N=38 is set, the timing of injecting the ball 59 into the guide rail 55 of the roulette body 51 is controlled at an angle unit $2\pi/38$. In this case, one angle is assigned to each of the plural number plates of the number display unit 53, that is, the angle position specifying the number is set at the center position (the middle position between two partitioning blades 52*a*) of the number plate for example, as illustrated in FIG. 15, for control.

As the result of study by the inventor, it could be seen that when the rotation center line of the roulette body is tilted about the vertical direction as in this embodiment, the ball easily goes into the pockets 52 of some numbers but does not go into other pockets 52 due to the influence of the mechanical precision or distortion or the like. That is, marked deviations are present in the probabilities that the ball goes into the pockets 52 corresponding to the numbers. In this roulette lottery apparatus, when one angle is assigned to one number to control the timing of injecting the ball 59 into the guide rail 55 of the roulette body 51, marked deviations are present in the lottery probabilities of a winning number and thus players' speculative spirit is reduced and the feasibility of the roulette game is lowered.

Therefore, this embodiment is characterized in that the timing of injecting the ball 59 into the guide rail 55 of the roulette body 51 is controlled at an angle unit smaller than 2π/N. Specifically, in this embodiment, when M is a predetermined natural number, the rotation angle of the roulette body 51 is specified at an angle unit 2π/(M·N) and controls the driving thereof. This means that 2π/N which is the smallest unit is further divided into M parts to control the angle.

Figure 16:
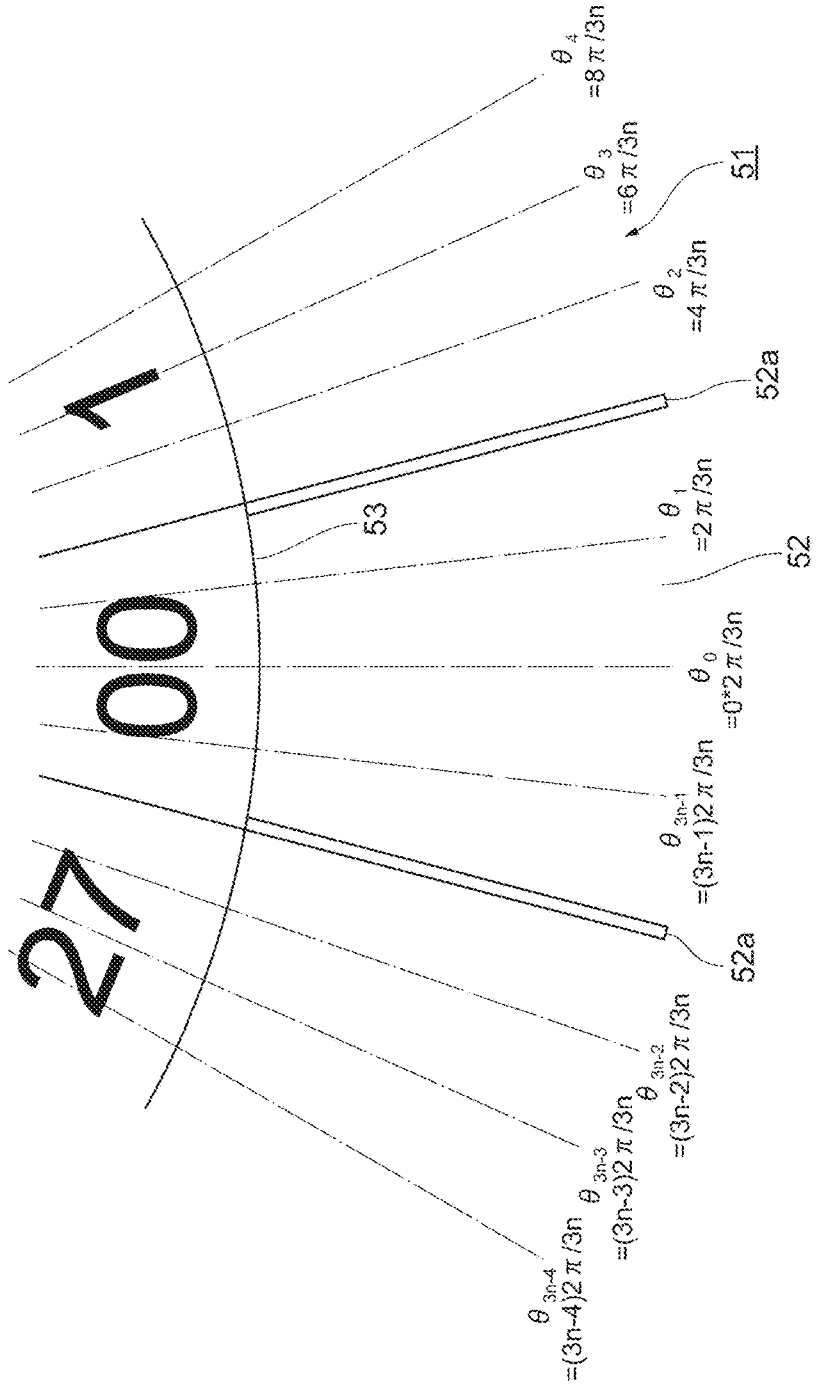
FIG. 16 is a partially enlarged pictorial view diagram illustrating the angle setting for number indication in the roulette body illustrated in FIG. 14, which shows a timing control example according to the present disclosure.

FIG. 16 is a partially enlarged view of a part surrounded with a circle in the vicinity of number "00" in FIG. 14 and shows an angle setting when M=3 is set. When N=38 is set, the timing of injecting the ball 59 into the guide rail 55 of the roulette body 51 is controlled at an angle unit 2π/114 (=(3*38). In this case, three angles are set for each number plate, that is, three angle positions are set between two partitioning blades 52*a* defining the width of the number plate, for example, as illustrated in FIG. 16, to control the timing.

Figure 17:
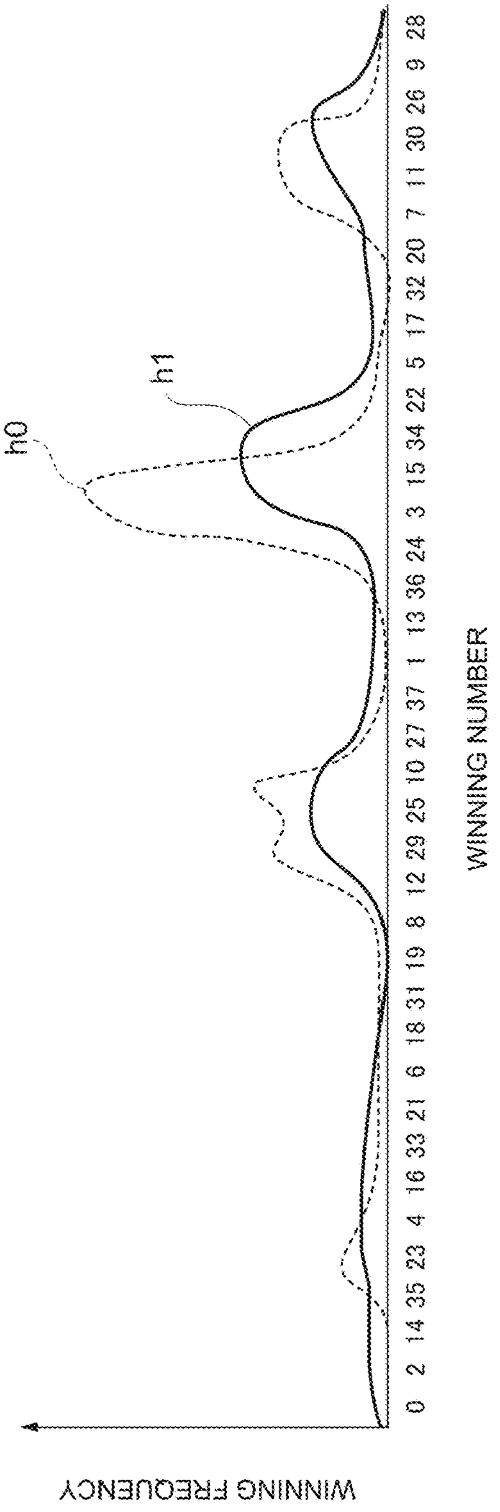
FIG. 17 is a histogram illustrating comparison of a winning frequency deviation in the normal timing control and a winning frequency deviation in the timing control according to the present disclosure.

FIG. 17 is a histogram illustrating comparison of a winning frequency deviation when the ball is injected at an angle unit of 2π/38 and a winning frequency deviation when the ball is injected at an angle unit of 2π/114. Histogram h0 represents the winning frequency deviation when the ball is injected at an angle unit of 2π/38 and histogram h1 represents the winning frequency deviation when the ball is injected at an angle unit of 2π/114.

Specifically, histogram h0 is obtained by measuring the number of times in which the ball goes into the pockets of the respective numbers of the roulette body when the ball is injected at the timing at which number "0" reaches the reference position $\theta_0$. That is, this is the position illustrated in FIG. 15. On the contrary, histogram h1 is obtained by measuring the number of times in which the ball goes into the pockets of the respective numbers of the roulette body when the ball is injected at the timing at which number "0" reaches any of positions $\theta_{3n-1}$, $\theta_0$, and $\theta_1$.

As illustrated in FIG. 17, compared with the case where the ball is injected at an angle unit of 2π/38 (histogram h0), it can be seen that the winning frequencies of the respective numbers are more clearly equalized when the ball is injected at an angle unit of 2π/114 (histogram h1).

The ball release control unit 84 according to this embodiment is configured to calculate one integer P of 0 to M*N by random number calculation and to inject the ball 59 when the roulette body rotates by an angle P*2π/(M*N) from the reference position of the roulette body 51. Specifically, in the example illustrated in FIG. 16, the possible range of the random number P is 0≤P<M*N=114 and the possible range of the angle $\theta_n$ is $0 \le \theta_n < 2\pi$ in the resolution of 2π/114.

Here, the natural number M is equal to or greater than 2. However, as M increases, the histogram is more equalized but the number of units of control increases, thereby increasing the processing load. The natural number M can be determined to be a proper value, for example, M=3 or M=4, from this tradeoff relationship.

The histogram illustrated in FIG. 17 shows how the winning frequency deviation is reduced when the number at which the ball is released is determined to be "0", but in this embodiment, the number at which the ball is released is not limited to a specific number but is set to any number of the maximum N numbers (=38) and the release timing is set to one selected from numerals of the division number M×the maximum number N (=3×38=114). The winning frequency deviation is more greatly reduced than that in FIG. 17 and the winning frequencies are almost equalized.

In this embodiment, the encoder 43 is used to detect an angle. In general, since the encoder outputs a digital value of resolution determined to be the number of bits as a relative value of an angle, the timing of releasing the ball 59 can be specified on the basis of the digital value detected by the encoder 43 in the timing control method.

Operation of Roulette Game System

Figure 18:
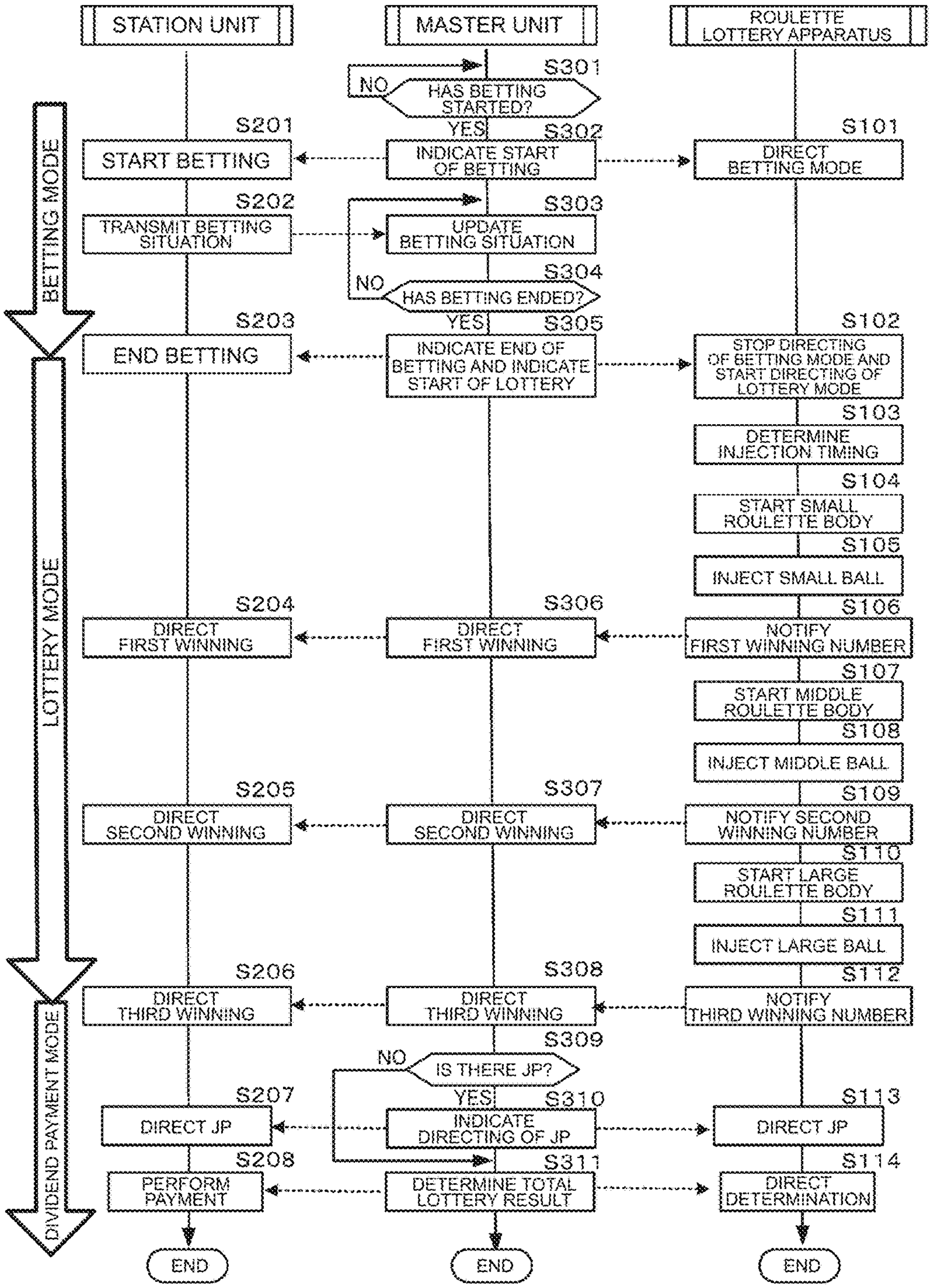
FIG. 18 is a flowchart illustrating a series of operations in the roulette game system.

Subsequently, a series of operations of the roulette game in the roulette lottery apparatus 100 according to this embodiment will be described along with the operations in the station unit 200. FIG. 18 is a flowchart illustrating a series of operations in the roulette game system 1000 according to this embodiment. FIG. 18 is a flowchart in which the operations of the roulette lottery apparatus 100, the station unit 200, and the master unit 300 are arranged in the first round of the roulette game comprising the betting mode, the lottery mode, and the dividend payment mode. The series of processes in the flowchart are performed for each game round.

Betting Mode In step S301, the master unit 300 waits for the timing of starting the betting period until the game is ready to start, for example, all the balls 59 are reloaded to the ball release device 60 (NO in S301). When the timing of starting the betting period comes in (YES in S301), the master unit 300 transmits a command indicating that the betting period is started to the roulette lottery apparatus 100 and the station units 200 in step S302. In step S201, the station unit 200 receiving the command displays a directed image in the betting period on the display unit 203 and notifies the player that the player should bet. In step S101, the roulette lottery apparatus 100 receiving the command performs directing of the betting mode. Specifically, the control unit 80 causes the central projector 7 to display a directed image in the betting mode, causes the illumination devices 8 to perform illumination directing in the betting mode, causes the history display unit 9 to display a directed image in the betting mode, causes the LEDs 56 to perform lighting directing in the betting mode, and causes the housing speakers 6 to output sound directing in the betting mode.

The station unit 200 transmits the betting situation as update data to the master unit 300 whenever the player operates the operation unit 205 to bet chips on the betting board (step S202). The master unit 300 updates the betting data 92 in the storage unit 90 whenever the update data of the betting situation is transmitted from the station units 200 (step S303). Whenever the betting data 92 is updated, the master unit 300 updates the live screen image displayed on the side monitors 500.

In step S304, the master unit 300 determines the remaining time of the betting period, and receives the update data of the betting situations from the station units 200 (step S303) when the betting period does not pass (NO in S304). When the betting period passes (YES in step S304), the master unit 300 transmits a command indicating that the betting mode ends to the station units 200 in step S305. The station units 200 receiving the command inhibit reception of inputs to the operation unit 205 by the players and display a directed image indicating the end of the betting period on the display unit 203.

The master unit transmits a command indicating that the betting mode ends and the lottery mode is started to the roulette lottery apparatus 100 in step S305. The roulette lottery apparatus 100 receiving the command stops the directing of the betting mode and starts the directing of the lottery mode (step S102). Specifically, the control unit 80 causes the central projector 7 to display a directed image in the lottery mode, causes the illumination devices 8 to perform illumination directing in the lottery mode, causes the history display unit 9 to display a directed image in the lottery mode, causes the LEDs 56 to perform lighting directing in the lottery mode, and causes the housing speakers 6 to output sound directing in the lottery mode.

Lottery Mode

When the lottery mode is started, the roulette lottery apparatus 100 determines the timing of injecting the ball 59 in step S103. Specifically, as described in (3. Timing Control of Roulette Lottery Apparatus), the ball release control unit 85 of the control unit 80 generates a random number P and determines one timing of releasing the ball 59 from the reference position $\theta_0$. The release timing is determined for each of three of the large roulette body 51A, the middle roulette body 51B, and the small roulette body 51C.

In step S104, the roulette lottery apparatus 100 starts the small roulette body 51C. Specifically, the roulette body control unit 83 of the control unit 80 determines the start timing and the drive system control unit 82 outputs a drive signal to the drive system 40C. The rotation of the small roulette body 51C is started.

After a predetermined waiting time passes, the roulette lottery apparatus 100 injects the small ball 59C (step S105). Specifically, the ball release control unit 85 detects that the release timing determined in step S103 comes in and outputs a control signal indicating that the small ball 59C is released, and the ball release device 60C drives the solenoid 61 to release the small ball 59C located at the standby position SB. The small ball 59C is injected into the small guide rail 55C and starts swinging to the right and left sides.

When the swing width of the small ball 59C decreases and the small ball goes into any pocket 52C of the small roulette body 51C, the ball sensor 58 of the pocket 52 into which the small ball 59C goes outputs a detection signal. The roulette lottery apparatus 100 receiving the detection signal specifies a winning number in step S106 and transmits the specified number as a first winning number to the master unit 300 and the station units 200.

The master unit 300 receiving notification of the first wining number performs directing operations on the determination of the first winning number (step S306). Specifically, the control unit 80 causes the central projector 7 to display the first winning number, causes the illumination devices 8 to perform illumination directing on the determination of the first winning number, causes the history display unit 9 to display the first winning number, and causes the housing speakers 6 to perform sound directing on the determination of the first winning number. Additionally, the control unit 80 turns on the LEDs 56 of the number plate corresponding to the first winning number and turns off the LEDs 56 of the other number plates. Furthermore, the control unit 80 drives the small roulette body 51C until the number plate corresponding to the first winning number reaches the reference position (the 6:00 position), and then stops the rotation thereof.

The station units 200 receiving notification of the first winning number causes the display unit 203 to display a directed image on the determination of the first winning number in step S204.

When the first winning number is determined, the roulette lottery apparatus 100 starts the middle roulette body 51B in step S107. Specifically, the roulette body control unit 83 of the control unit 80 determines the start timing and the drive system control unit 82 outputs a drive signal to the drive system 40B. The rotation of the middle roulette body 51B is started.

After a predetermined waiting time passes, the roulette lottery apparatus 100 injects the middle ball 59B (step S108). Specifically, the ball release control unit 85 detects that the release timing determined in step S103 comes in and outputs a control signal indicating that the middle ball 59B is released, and the ball release device 60B drives the solenoid 61 to release the middle ball 59B located at the standby position SB. The middle ball 59B is injected into the middle guide rail 55B and starts swinging to the right and left sides.

When the swing width of the middle ball 59B decreases and the middle ball goes into any pocket 52B of the middle roulette body 51B, the ball sensor 58 of the pocket 52 into which the middle ball 59B goes outputs a detection signal. The roulette lottery apparatus 100 receiving the detection signal specifies a winning number in step S109 and transmits the specified number as a second winning number to the master unit 300 and the station units 200.

The master unit 300 receiving notification of the second wining number performs directing operations on the determination of the second winning number (step S307). Specifically, the control unit 80 causes the central projector 7 to display the second winning number, causes the illumination devices 8 to perform illumination directing on the determination of the second winning number, causes the history display unit 9 to display the second winning number, and causes the housing speakers 6 to perform sound directing on the determination of the second winning number. The control unit 80 turns on the LEDs 56 of the number plate corresponding to the second winning number and turns off the LEDs 56 of the other number plates. Furthermore, the control unit 80 drives the middle roulette body 51B until the number plate corresponding to the second winning number reaches the reference position (the 6:00 position), and then stops the rotation thereof.

The station units 200 receiving notification of the second winning number causes the display unit 203 to display a directed image on the determination of the second winning number in step S205.

When the first winning number is determined, the roulette lottery apparatus 100 starts the large roulette body 51A in step S110. Specifically, the roulette body control unit 83 of the control unit 80 determines the start timing and the drive system control unit 82 outputs a drive signal to the drive system 40A. The rotation of the large roulette body 51A is started.

After a predetermined waiting time passes, the roulette lottery apparatus 100 injects the large ball 59A (step S111). Specifically, the ball release control unit 85 detects that the release timing determined in step S103 comes in and outputs a control signal indicating that the large ball 59A is released, and the ball release device 60A drives the solenoid 61 to release the large ball 59A located at the standby position SB. The large ball 59A is injected into the large guide rail 55A and starts swinging to the right and left sides.

When the swing width of the large ball 59A decreases and the large ball goes into any pocket 52A of the large roulette body 51A, the ball sensor 58 of the pocket 52 into which the large ball 59A goes outputs a detection signal. The roulette lottery apparatus 100 receiving the detection signal specifies a winning number in step S112 and transmits the specified number as a third winning number to the master unit 300 and the station units 200.

The master unit 300 receiving notification of the third wining number performs directing operations on the determination of the third winning number (step S308). Specifically, the control unit 80 causes the central projector 7 to display the third winning number, causes the illumination devices 8 to perform illumination directing on the determination of the third winning number, causes the history display unit 9 to display the third winning number, and causes the housing speakers 6 to perform sound directing on the determination of the third winning number. Additionally, the control unit 80 turns on the LEDs 56 of the number plate corresponding to the third winning number and turns off the LEDs 56 of the other number plates. Furthermore, the control unit 80 drives the large roulette body 51A until the number plate corresponding to the third winning number reaches the reference position (the 6:00 position), and then stops the rotation thereof.

The station units 200 receiving notification of the third winning number causes the display unit 203 to display a directed image on the determination of the third winning number in step S206.

According to the above-mentioned process flow, since all the first to third winning numbers are stopped at the 6:00 position of the roulette bodies 51 and are lighted by the roulette LEDs, the players can easily recognize the lottery result (see the right-lower part of FIG. 4).

Dividend Payment Mode

The master unit 300 determines whether a jackpot (JP, big win) occurs in any station unit 200 as the determination result of the three winning numbers through the roulette lottery in the three roulette bodies 51 (step S309). When it is determined that a jackpot occurs in any station unit 200 (YES in step S309), the master unit 300 transmits a command indicating that jackpot directing should be performed to the station unit 200 to play a jackpot game (step S310).

The station unit 200 receiving notification of the jackpot directing performs a jackpot game (step S207). The station units 200 in which the jackpot does not occur display a directed image indicating the jackpot period. The master unit 300 causes the roulette lottery apparatus 100 to perform a directing operation on the jackpot (step S113). Specifically, the calculation unit 81*d* of the control unit 80 calculates the total dividend M for each station unit 200 and the payment unit 81*c* transmits the total dividend M to the respective station units 200. The station unit 200 receiving notification of the total dividend M pays chips or adds credits as the payment process based on the total dividend M to be paid (step S208). The master unit 300 causes the roulette lottery apparatus 100 to perform a determination directing operation (step S114). Specifically, the control unit 80 causes the central projector 7 to display a dividend directing image, causes the illumination devices 8 to perform an illumination directing operation for dividend directing, causes the history display unit 9 to display a dividend directing image, and causes the housing speaker 6 to output a sound on the dividend directing. The control unit 80 returns the balls 59 to the standby state. Specifically, the control unit 80 outputs a drive signal to the drive system 40 to rotate the large roulette body 51A, the middle roulette body 51B, and the small roulette body 51C in the clockwise direction, and stops the wheel when the balls 59 reach positions immediately before the ball reset devices 70. Subsequently, the ball reset devices 70 are controlled to extrude and move the balls 59 to the standby positions SB in the ball release devices 60.

According to this embodiment, even when the rotation center line of the roulette bodies (rotating bodies) 51 is tilted about the vertical direction, the timing of injecting the balls 59 is controlled on the basis of angles smaller than the angle obtained by dividing one circumference (2π) by the total number N of the pockets 52. It is possible to provide a roulette game which is visible to plural players and to reduce the winning probability deviation among the plural pockets 52.

According to this embodiment, since one angle selected from plural angles obtained by dividing the total number N of the pockets 52 by M using a random number P is determined to be the timing of releasing the balls 59, it is possible to equalize the winning probabilities of the plural pockets 52. The roulette lottery apparatus can be used even in environments in which the lottery probabilities are strictly uniform such as casinos.

According to this embodiment, since the lottery using a next roulette body 51 is started after the lottery using one roulette body 51 is completed, it is possible to provide exciting directing such as lottery winning number presentation of slowly determining winning numbers.

According to this embodiment, since the dividend cover corresponding to the combination of the winning numbers based on the lottery using plural roulette bodies 51 is set, the dividend increases in comparison with a game using a single roulette body and it is thus possible to stimulate players' speculative spirit.

The present disclosure is not limited to the above-mentioned embodiment and can be modified in various forms without changing the gist of the present disclosure. For example, the following modifications are possible.

In the above-mentioned embodiment, the rotation position of the roulette body 51 is specified on the basis of the relative value of the angle (radian) detected by the encoder 43, but the rotation position is not limited thereto. The rotation position may be specified using other physical quantities, as long as the rotation position of a rotating body can be specified. For example, the timing of injecting the ball 59 may be controlled on the basis of the elapsed time T after the reference position is passed. In this case, the injection timing may be specified on the basis of the angular velocity ω or the period T of the roulette body 51.

In the above-mentioned embodiment, the timing of injecting the ball in the roulette game is controlled, but the present disclosure is not limited thereto. The technical spirit of the present disclosure can be applied to game apparatuses other than an apparatus capable of implementing a so-called typical roulette game, as long as unevenness in winning probability occurs by mechanically controlling a shooting timing.

In the above-mentioned embodiment, the division number M for each number is set to 3, but the present disclosure is not limited thereto. When unevenness in winning probability of the respective pockets 52 can be allowed, the division number M may be set to 2. On the contrary, when the unevenness in winning probability of the respective pockets 52 is further corrected, the division number M may be set to 4 or greater.

In the above-mentioned embodiment, one number is selected from the numbers of 0 to the number of pockets N×the division number M using a random number P to determine the timing of injecting the ball 59, but the present disclosure is not limited thereto. For example, when the unevenness in winning probability of the respective pockets 52 can be allowed, one number may be selected from the numbers of the division number M using a random number P to determine the timing of injecting the ball 59. In this case, the injection timing is determined to be a specific number (for example, "00").

In the above-mentioned embodiment, the roulette lottery apparatus 100 having three roulette bodies 51A, 51B, and 51C is exemplified, but the present disclosure is not limited thereto. The number of roulette bodies 51 may be one, two, or four or more.

In the above-mentioned embodiment, the rotation speeds of the three roulette bodies 51A, 51B, and 51C are not particularly defined, but the rotation speeds of the roulette bodies 51 are not limited. For example, the rotation speeds may slow down in the order of the small roulette body 51C, the middle roulette body 51B, and the large roulette body 51A. As the size of the roulette body increases, burdens on the drive system and the other mechanical elements are great. By setting the rotation speeds in this way, it is possible to reduce the mechanical burdens. As the size of the roulette body increases, the rotation of the structure gives a large feeling of overpowering to players. By setting the rotation speeds in this way, it is possible to reduce the feeling of overpowering to players. When the rotation speeds of the three roulette bodies 51A, 51B, and 51C are different, it is possible to lower the possibility that players will be astonished.

In the above-mentioned embodiment, the rotation directions of the three roulette bodies 51A, 51B, and 51C are not particularly defined, but the present disclosure is not limited to the above-mentioned rotation directions of the roulette bodies 51. For example, the roulette bodies 51 may be made to rotate in the clockwise direction or may be made to rotate in the counterclockwise direction. The rotation directions of the small roulette body 51C, the middle roulette body 51B, and the large roulette body 51A may be made to be different.

In the above-mentioned embodiment, the rotation speeds of the three roulette bodies 51A, 51B, and 51C are not particularly limited, but the present disclosure is not limited to the above-mentioned rotation speeds of the roulette bodies 51. For example, the rotation speeds (angular velocities) of the respective roulette bodies 51 may set to be constant, or the speeds may be changed in the course of rotation, or the roulette bodies may be made to rotate intermittently. That is, the roulette bodies may be made to irregularly rotate.

In the above-mentioned embodiment, the rotation center line of the roulette lottery apparatus 100 is tilted by 10° about the horizontal plane, but the present disclosure is not limited thereto. As the slope of the rotation center line gets closer to the vertical direction, the speed at which the balls 59 swing can become higher. As the slope of the rotation center line gets closer to the horizontal direction, the speed at which the balls 59 swing can become lower.

In the above-mentioned embodiment, the system is controlled centered on the master unit 300, but the master unit 300 is not an essential element. For example, all or a part of the functions of the master unit 300 may be incorporated into the roulette lottery apparatus 100. For example, the station units 200 and the roulette lottery apparatus 100 may be connected to each other, and the roulette lottery apparatus 100 or one or more station units 200 may alternate or complement the functions of the master unit 300.

In the above-mentioned embodiment, the master unit 300 or the station units 200 illustrated in FIG. 1 are embodied as a dedicated computer system, but the present disclosure is not limited thereto. For example, a mobile computer, a portable terminal, or a game machine may be employed, as long as it is a computer system capable of accessing the network 400.

As described above, the roulette lottery apparatus and the timing control program according to the present disclosure can markedly enhance fun of, interest in, or preference for the game and can improve a sense of participation or a desire for continuation in the game of a player, in comparison with the conventional roulette game or the like. The present disclosure can be widely and effectively used for the fields of software and hardware techniques associated with provision and implementation of games and activities such as design, manufacturing, and sale thereof.

DESCRIPTION OF REFERENCE NUMBERS

2: base,
6 (6H, 6L): housing speaker (speaker for high-pitched tone),
7: central projector,
8: illumination device,
9: history display unit,
10: support frame,
11: vertical frame,
12: horizontal frame,
13: front-and-rear frame,
14: tilt frame,
15: mounting frame,
20: fixing member,
21: wheel rail base,
22: (plural) bracket,
23: fixed base,
40: drive system,
41: roulette body drive motor (drive source),
43: encoder,
50: roulette constituent,
51 (51A, 51B, 51C): roulette body (rotating body) (large roulette body 51A, middle roulette body 51B, small roulette body 51C),
52 (52A, 52B, 52C): pocket (large pocket 52A, middle pocket 52B, small pocket 52C), 52*a*: partitioning blade,
53 (53A, 53B, 53C): number display unit (large number display unit 53A, middle number display unit 53B, small number display unit 53C),
54: illumination for directing ball revolution,
55 (55A, 55B, 55C): guide rail (guide mechanism) (large guide rail 55A, middle guide rail 55B, small guide rail 55C),
56: LED (light source),
57: drop-preventing guard,
58: ball sensor,
59 (59A, 59B, 59C): ball (lottery ball) (large ball 59A, middle ball 59B, small ball 59C),
60: ball release device,
61: solenoid, 61*a*: plunger,
62: solenoid sensor,
63: roller,
64: release sensor,
65: setting sensor,
66*a*: roller support lever,
66*b*: pivot,
66*c*: link,
66*d*: transmission lever,
66*e*: pivot,
67: coil spring,
68: mounting plate,
69: cover plate,
70: ball reset device,
71: ball reset motor,
72: gear train,
73: torque limiter,
74: ball screw,
75: change nut,

76: ball extruding rod,
76*a*: sensor dog,
77: home sensor,
78: limit sensor,
79: mounting frame member,
80: control unit,
81: game control unit,
81*a*: setting unit,
81*b*: determination unit,
81*c*: payment unit,
81*d*: calculation unit,
82: drive system control unit,
83: roulette body control unit,
84: ball release control unit,
85: ball reset control unit,
86: display control unit,
87: sound control unit,
88: illumination control unit,
90: storage unit,
91: game program,
92: betting data,
93: reference information,
94: payout ratio data,
100: roulette lottery apparatus,
200: (200-N): station unit,
201: housing,
203: display unit,
205: operation unit,
300: master unit,
400: network,
500: side monitor,
1000: roulette game system,
$\theta_n$: n-th angle from reference position of roulette body

The invention claimed is:

1. A roulette lottery apparatus comprising:

a first rotating body configured to revolve about a rotation center line tilted about a vertical direction, in which a plurality, N1, of first pockets are arranged in a circumferential direction in a first circumferential area separated by a first distance in a radial direction from the rotation center line;

a first guide mechanism that guides a first lottery ball to any one of the plurality of first pockets and that guides the first lottery ball in an area including at least a lowest point of the first circumferential area in which the plurality of first pockets revolve;

a first lottery ball injecting mechanism that injects the first lottery ball into the first guide mechanism; and a control unit that controls injecting the first lottery ball when the first rotating body rotates to a first rotation position specified using an angle unit smaller than 2π/N1.

2. The roulette lottery apparatus according to claim 1, wherein the control unit calculates one number P1, where P1 is a natural number between 0 and M1 *N1, by random number calculation, and where M1 represents a predetermined natural number, and injects the first lottery ball when the first rotating body rotates to the first rotation position equaling an angle of P1*2π/(M1*N1) as determined from a reference position of the first rotating body.

3. The roulette lottery apparatus according to claim 1, further comprising:

a second rotating body configured to revolve about the rotation center line, in which a plurality, N2, of second pockets are arranged in the circumferential direction in a second circumferential area separated by a second distance in the radial direction from the rotation center line;

a second guide mechanism that guides a second lottery ball to any one of the plurality of second pockets and that guides the second lottery ball in an area including at least a lowest point of the second circumferential area in which the plurality of second pockets revolve; and a second lottery ball injecting mechanism that injects the second lottery ball into the second guide mechanism, wherein the control unit controls injecting the second lottery ball when the second rotating body rotates to a second rotation position specified using an angle unit smaller than 2π/N2.

4. The roulette lottery apparatus according to claim 3, wherein the control unit calculates one number P2, where P2 is a natural number between 0 and M2*N2, by random number calculation, where M2 represents a predetermined natural number, and injects the second lottery ball when the second rotating body rotates to the second rotation position equaling an angle of P2*2π/(M2*N2) as determined from a reference position of the second rotating body.

5. The roulette lottery apparatus according to claim 3, wherein the control unit injects the second lottery ball after the first lottery ball is guided to any one of the plurality of first pockets of the first rotating body.

6. A method of controlling a release of a lottery ball of a roulette lottery apparatus, the method comprising:

configuring a rotating body to revolve about a rotation center line tilted about a vertical direction, in which a plurality, N1, of pockets are arranged in a circumferential direction in a circumferential area separated by a distance in a radial direction from the rotation center line, guiding, with a guide mechanism, the lottery ball to any one of the plurality of first pockets including at least a lowest point of the circumferential area, and injecting, using an injecting mechanism controlled by a control unit, the lottery ball into the guide mechanism when the rotating body rotates to a first rotation position, determined by measuring a rotation angle from a reference position of the rotating body, and wherein the rotation position equals P1*2π/(M1*N1), where P1 is calculated by a random number calculation and is a natural number between 0 and M1*N1 and M1 represents a predetermined natural number.

* * * * *